(12) United States Patent
Ha et al.

(10) Patent No.: US 12,271,565 B2
(45) Date of Patent: Apr. 8, 2025

(54) TOUCH DISPLAY DEVICE AND DISPLAY PANEL

(71) Applicant: LG Display Co., Ltd., Seoul (KR)

(72) Inventors: Kyungsu Ha, Gumi-si (KR); Wooram Oh, Chilgok-gun (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/437,082

(22) Filed: Feb. 8, 2024

(65) Prior Publication Data

US 2024/0211085 A1    Jun. 27, 2024

Related U.S. Application Data

(63) Continuation of application No. 17/901,795, filed on Sep. 1, 2022, now Pat. No. 11,928,300.

(30) Foreign Application Priority Data

Sep. 6, 2021 (KR) ..................... 10-2021-0118513

(51) Int. Cl.
*G06F 3/044* (2006.01)
*G06F 3/041* (2006.01)

(52) U.S. Cl.
CPC ........ *G06F 3/0446* (2019.05); *G06F 3/04166* (2019.05); *G06F 3/0445* (2019.05)

(58) Field of Classification Search
CPC .. G06F 3/0446; G06F 3/0443; G06F 3/04164; G06F 3/0445; G06F 2203/04111
See application file for complete search history.

(56) References Cited

U.S. PATENT DOCUMENTS

| | | |
|---|---|---|
| 2013/0206567 A1 | 8/2013 | Hong et al. |
| 2017/0185193 A1* | 6/2017 | Kim ................. G02F 1/136286 |
| 2021/0048936 A1 | 2/2021 | Cui et al. |

* cited by examiner

*Primary Examiner* — Deeprose Subedi
(74) *Attorney, Agent, or Firm* — Seed IP Group LLP

(57) ABSTRACT

Disclosed herein is a touch display device and a display panel. The touch display device includes a display panel in which a plurality of X-touch electrode lines, which extend in a first direction and receive a touch driving signal through a plurality of X-touch lines, and a plurality of Y-touch electrode lines, which extend in a second direction and transmit a touch sensing signal through a plurality of Y-touch lines, are disposed, and a touch driving circuit configured to supply the touch driving signal to the plurality of X-touch electrode lines and receive the touch sensing signal from the Y-touch electrode line to sense a touch, wherein overlapping areas in which at least some of the plurality of X-touch lines overlap at least some of the plurality of Y-touch lines are different.

20 Claims, 21 Drawing Sheets

FIG.14

|  | Y-TEL1 | Y-TEL2 | Y-TEL3 | Y-TEL4 | Y-TEL5 |
|---|---|---|---|---|---|
| X-TEL1 | 8 | 8 | 9 | 10 | 10 |
| X-TEL2 | 8 | 9 | 10 | 10 | 10 |
| X-TEL3 | 8 | 9 | 10 | 10 | 10 |
| X-TEL4 | 9 | 10 | 10 | 10 | 10 |

TOUCH DISPLAY DEVICE AND DISPLAY PANEL

CROSS-REFERENCE TO RELATED APPLICATION

This application is a continuation application of U.S. Ser. No. 17/901,795 filed Sep. 1, 2022, which claims priority from Korean Patent Application No. 10-2021-0118513, filed on Sep. 6, 2021, which is hereby incorporated by reference for all purposes as if fully set forth herein.

BACKGROUND

Technical Field

The present disclosure relates to a touch display device and a display panel, and more particularly, to a display device and a display panel, which reduce touch noise and improve touch sensing performance by compensating for a difference in capacitance between a non-square area and a square area in a non-square display panel.

Description of the Related Art

As the information society develops, demands for display devices for displaying images are increasing in various forms. Various display devices such as liquid crystal displays, electroluminescent displays, and quantum dot light-emitting displays are used as display devices.

In order to provide a wider variety of functions, a display device provides a function of recognizing a finger touch of a user or a pen touch on a display panel and performing input processing based on the recognized touch.

For example, a touch display device capable of recognizing a touch includes a plurality of touch electrodes disposed or embedded in a display panel and may drive the touch electrodes to detect the presence of a touch of a user and touch coordinates on a display panel.

There is a tendency in that the range of use of touch display devices is expanding in mobile devices such as smart phones and tablet personal computers (PCs) as well as large-screen touch display devices such as displays for vehicles and exhibitions.

As described above, as the touch display devices are used as display devices in various fields, a non-square display screen including a circular-shaped display screen is required. Thus, a structure of a display panel is increasingly being formed of various structures such as circle shapes other than quadrangular shapes.

BRIEF SUMMARY

The inventors have realized that, in a touch display device with a non-square structure, since an outer periphery of a display panel has various shapes including as curved surfaces, a difference in capacitance formed between a touch electrode located in a non-square area and a touch electrode located in a square area occurs, and thus a problem of touch performance degradation occurs.

Accordingly, the inventors of the present disclosure have invented a display device and a display panel, which reduce touch noise and improve touch sensing performance by compensating for a difference in capacitance between a non-square area and a square area in a non-square display panel.

An aspect of the present disclosure is also to provide a display device and a display panel, which compensate for a difference in capacitance between a non-square touch node and a normal touch node by differentiating an overlapping area between a touch driving line transmitting a touch driving signal and a touch sensing line transmitting the touch sensing signal.

The problems to be solved by the present disclosure, which will be described below, are not limited to the above-described problems, and other problems that are not described can be clearly understood by those skilled in the art from the following description.

In an aspect, embodiments of the present disclosure may provide a touch display device including a display panel in which a plurality of X-touch electrode lines, which extend in a first direction and to which a touch driving signal is transmitted through a plurality of X-touch lines, and a plurality of Y-touch electrode lines, which extend in a second direction and transmit a touch sensing signal through a plurality of Y-touch lines, are arranged, and a touch driving circuit configured to supply the touch driving signal to the plurality of X-touch electrode lines and receive the touch sensing signal from the Y-touch electrode lines to sense a touch, wherein overlapping areas in which at least some of the plurality of X-touch lines overlap at least some of the plurality of Y-touch lines are different.

At least some of the plurality of X-touch lines may overlap at least some of the plurality of Y-touch lines in a bezel area of the display panel.

At least some of the plurality of X-touch lines may overlap at least some of the plurality of Y-touch lines in a printed circuit board (PCB) on which the touch driving circuit is disposed.

At least some of the plurality of X-touch lines may overlap at least some of the plurality of Y-touch lines in a PCB for compensation located between the touch driving circuit and the display panel.

The plurality of X-touch lines and the plurality of Y-touch lines may be classified into a plurality of groups according to positions of the plurality of X-touch electrode lines and the plurality of Y-touch electrode lines, and overlapping areas between the plurality of X-touch lines and the plurality of Y-touch lines may be determined for each group.

The overlapping area may be formed to be large with respect to an X-touch line connected to an X-touch electrode line located in a non-square area among the plurality of X-touch electrode lines and a Y-touch line connected to a Y-touch electrode line located in the non-square area among the plurality of Y-touch electrode lines, compared with other X-touch lines and other Y-touch lines.

An overlapping area between the X-touch line connected to the X-touch electrode line located in the non-square area and the Y-touch line connected to the Y-touch electrode line located in the non-square area may be proportional to a difference between a capacitance value of the non-square area and a capacitance value of the square area.

The overlapping area may be determined by varying widths of at least some of the plurality of X-touch lines.

The overlapping area may be determined by varying widths of at least some of the plurality of Y-touch lines.

The overlapping area may be determined by varying widths of at least some of the plurality of X-touch lines and widths of at least some of the plurality of Y-touch lines.

The plurality of X-touch lines may be formed to have a constant distance between contact holes electrically connected to a designated X-touch electrode and Y-touch electrode lines adjacent thereto.

In another aspect, embodiments of the present disclosure may provide a display panel including a plurality of X-touch electrode lines which extend in a first direction and to which a touch driving signal is transmitted through a plurality of X-touch lines, and a plurality of Y-touch electrode lines configured to extend in a second direction and transmit a touch sensing signal through a plurality of Y-touch lines, wherein overlapping areas in which at least some of the plurality of X-touch lines overlap at least some of the plurality of Y-touch lines are different.

According to embodiments of the present disclosure may provide a display device and a display panel, which reduce touch noise and improves touch sensing performance by compensating for a difference in capacitance between a non-square area and a square area in a non-square display panel.

In addition, according to embodiments of the present disclosure may provide a display device and a display panel, which compensate for a difference in capacitance between a non-square touch node and a normal touch node by differentiating an overlapping area between a touch driving line transmitting a touch driving signal and a touch sensing line transmitting the touch sensing signal.

The technical effects to be achieved by the present disclosure, which will be described below, are not limited to the above-described effects, and other effects that are not described can be clearly understood by those skilled in the art from the following description.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which:

FIG. 14 is a diagram illustrating a case in which a capacitance value of the non-square area is compensated by differentiating an overlapping area of the touch line in the touch display device according to one embodiment of the present disclosure;

DETAILED DESCRIPTION

Figure 1:
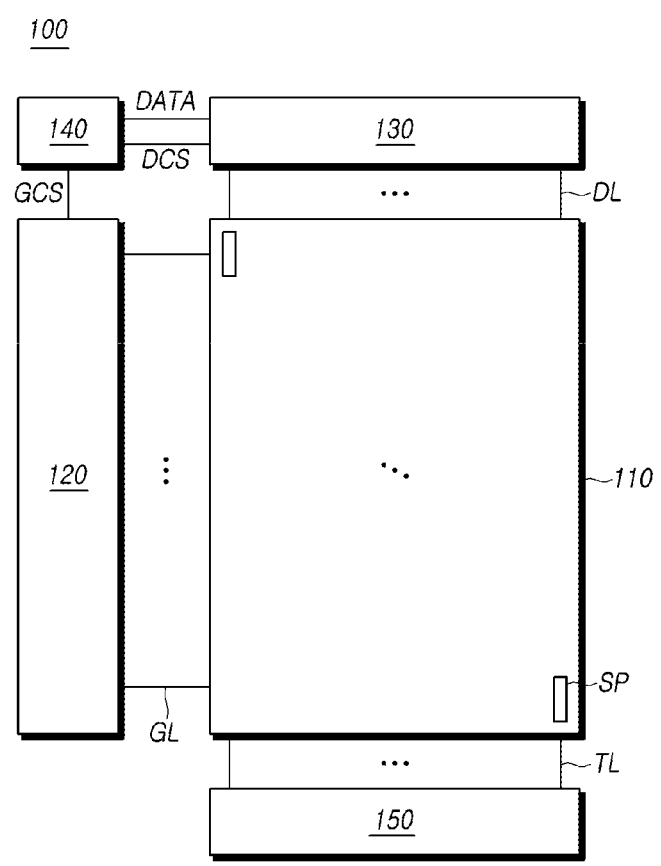
FIG. 1 is a diagram illustrating a schematic configuration of a touch display device according to one embodiment of the present disclosure.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in a variety of different forms. Rather, these embodiments are provided so that the present disclosure will be thorough and complete, and will fully convey the scope of the present disclosure to those having ordinary knowledge in the technical field.

The shapes, sizes, ratios, angles, numbers, and the like inscribed in the drawings to illustrate embodiments are illustrative only, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in situations in which the subject matter of the present disclosure may be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in a situation in which there is no explicit description thereof.

When spatially relative terms, such as "on," "above," "under," "below," and "on a side of," are used herein for descriptions of relationships between one element or component and another element or component, one or more intervening elements or components may be present between the one and other elements or components, unless a term such as "directly" is used.

When temporally relative terms, such as "after," "subsequent," "following," and "before" are used to define a temporal relationship, a non-continuous case may be included unless the term "immediately" or "directly" is used.

In descriptions of signal transmission, such as "a signal is sent from node A to node B," the signal may be sent from node A to node B via another node unless the term "immediately" or "directly" is used.

In addition, terms such as "first" and "second" may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of embodiments of the present disclosure may be partially or entirely coupled or combined with each other and may work in concert with each other or may operate in a variety of technical methods. In addition, respective embodiments may be carried out independently or may be associated with and carried out in concert with other embodiments.

Hereinafter, a variety of embodiments will be described in detail with reference to the accompanying drawings.

FIG. 1 is a diagram illustrating a schematic configuration of a touch display device according to embodiments of the present disclosure.

Referring to FIG. 1, a touch display device 100 according to embodiments of the present disclosure may include a display panel 110, a gate driving circuit 120, a data driving circuit 130, a timing controller 140, and a touch driving circuit 150 for sensing a touch on the display panel 110.

A plurality of gate lines GL and a plurality of data lines DL are disposed in the display panel 110, and a plurality of sub-pixels SP are disposed in areas where the gate lines GL and the data lines DL overlap.

In addition, a plurality of touch electrodes may be disposed or embedded in the display panel 110, and a plurality of touch lines TL may be disposed in the display panel 110 to electrically connect the touch electrodes to the touch driving circuit 150.

First, to describe a configuration for driving the display in the touch display device 100, the gate driving circuit 120 controls a driving timing of the sub-pixel SP disposed in the display panel 110. In addition, the data driving circuit 130 supplies a data voltage corresponding to image data to the sub-pixel SP. Consequently, the sub-pixel SP emits light with brightness corresponding to a gradation of the image data to display an image.

Specifically, the gate driving circuit 120 is controlled by the timing controller 140 and sequentially outputs scan signals to the plurality of gate lines GL disposed in the display panel 110 to control driving timings of the plurality of sub-pixels SP.

The gate driving circuit 120 may include one or more gate driving integrated circuits (GDIC), and according to a driving method, the gate driving circuit 120 may be located on only one side or both sides of the display panel 110. Alternatively, the gate driving circuit 120 may be directly embedded in a bezel area of the display panel 110 to be implemented in the form of a gate in panel (GIP).

The data driving circuit 130 receives digital image data DATA from the timing controller 140 and converts the image data DATA into an analog data voltage. In addition, the data driving circuit 130 outputs the data voltage to each data line DL according to a timing when the scan signal is applied through the gate line GL, thereby allowing each sub-pixel SP to express brightness according to the data voltage.

The data driving circuit 130 may include one or more source driving integrated circuits (SDICs).

The timing controller 140 supplies various control signals to the gate driving circuit 120 and the data driving circuit 130 to control operations of the gate driving circuit 120 and the data driving circuit 130.

The timing controller 140 controls the gate driving circuit 120 to output a scan signal according to the timing implemented in each frame, converts image data received from an external device according to a data signal format used in the data driving circuit 130, and outputs the converted image data DATA to the data driving circuit 130.

The timing controller 140 receives various timing signals including a vertical synchronization signal, a horizontal synchronization signal, an input data enable signal, and a clock signal from an external device (e.g., a host system) together with the image data DATA.

The timing controller 140 may generate a data control signal DCS and a gate control signal GCS using the various timing signals received from the external device and output the data control signal DCS and the gate control signal GCS to the data driving circuit 130 and the gate driving circuit 120, respectively.

For example, in order to control the gate driving circuit 120, the timing controller 140 outputs various gate control signals GCS including a gate start pulse, a gate shift clock, and a gate output enable signal.

Here, the gate start pulse controls operation start timings of one or more GDICs constituting the gate driving circuit 120. The gate shift clock is a clock signal commonly input to the one or more GDICs and controls a shift timing of the scan signal. The gate output enable signal specifies timing information of the one or more GDICs.

In addition, in order to control the data driving circuit 130, the timing controller 140 outputs various data control signals DCS including a source start pulse, a source sampling clock, and a source output enable signal.

Here, the source start pulse controls a data sampling start timing of the one or more SDICs constituting the data driving circuit 130. The source sampling clock is a clock signal for controlling a sampling timing of data in each SDIC. The source output enable signal controls an output timing of the data driving circuit 130.

The touch display device 100 may further include a power management IC which supplies various voltages or various currents to the display panel 110, the gate driving circuit 120, the data driving circuit 130, and the touch driving circuit 150 or controls various voltages or various currents which will be supplied.

In this case, the touch display device 100 may include at least one printed circuit board (PCB) for a circuit connection between the touch driving circuit 150 and other devices.

In this case, one side of a film on which the touch driving circuit 150 is mounted may be connected to the at least one printed circuit board. That is, one side of the film on which the touch driving circuit 150 is mounted may be electrically connected to the printed circuit board, and the other side thereof may be electrically connected to the display panel 110.

Meanwhile, when an encapsulation layer is formed on an upper portion of the display panel 110 and the touch electrode is disposed on an upper portion of the encapsulation layer, capacitance for driving the touch electrode may increase. Thus, it is beneficial to increase a level of a touch driving signal for driving the touch electrode. To this end, a level shifter (not shown) may be added between the touch driving circuit 150 and the display panel 110 to control the level of the touch driving signal.

Each sub-pixel SP is positioned adjacent to a region of overlap of the gate line GL and the data line DL, and according to the type of the touch display device 100, a liquid crystal or a light-emitting element may be disposed at each sub-pixel SP.

For example, when the touch display device 100 is a liquid crystal display device, a light source device such as a backlight unit or structure for emitting light to the display panel 110 is included, and a liquid crystal is disposed at each sub-pixel SP of the display panel 110. In addition, since an arrangement of the liquid crystal is adjusted due to an electric field formed when the data voltage is applied to each sub-pixel SP, each sub-pixel SP may exhibit a brightness according to the data voltage and may display an image.

In the case of the liquid crystal display device, the display panel 110 includes a liquid crystal layer formed between two substrates and may operate in any known mode such as a twisted nematic (TN) mode, a vertical alignment (VA) mode, an in plane switching (IPS) mode, or a fringe field switching (FFS) mode. Meanwhile, in the case of the electroluminescent display device, the display panel 110 may be implemented in a top emission method, a bottom emission method, or a dual emission method.

Meanwhile, the touch display device 100 according to embodiments of the present disclosure may detect a touch of a user with respect to the display panel 110 using the touch electrode and the touch driving circuit 150, which are included in the display panel 110.

Figure 2:
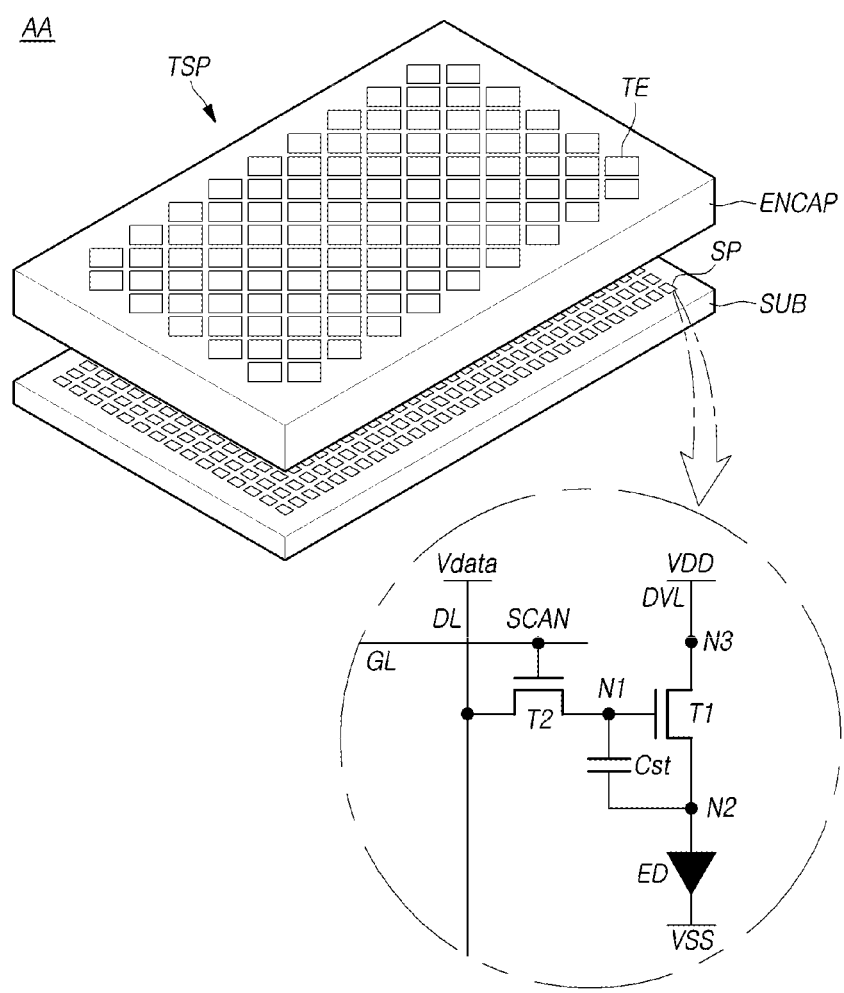
FIG. 2 is a diagram illustrating a structure in which a touch screen panel is embedded in a display panel in the touch display device according to one embodiment of the present disclosure.

FIG. 2 is an diagram illustrating a structure in which a touch screen panel is embedded in a display panel in the touch display device according to embodiments of the present disclosure.

Referring to FIG. 2, in the touch display device 100 according to embodiments of the present disclosure, the plurality of sub-pixels SP are disposed on a substrate SUB in a display area AA of the display panel 110.

Each sub-pixel SP may include a light-emitting element ED, a first transistor T1 for driving the light-emitting element ED, a second transistor T2 for applying a data voltage Vdata to a first node N1 of the first transistor T1, and a storage capacitor Cst for maintaining a predetermined or selected voltage during one frame.

The first transistor T1 may include the first node N1 to which the data voltage Vdata is applied through the second transistor T2, a second node N2 electrically connected to the light-emitting element ED, and a third node N3 to which a driving voltage VDD is applied from a driving voltage line DVL. The first node N1 may be a gate node, the second node N2 may be a source node or a drain node, and the third node N3 may be a drain node or a source node. The first transistor T1 is referred to as a driving transistor for driving the light-emitting element ED.

The light-emitting element ED may include a first electrode (e.g., an anode electrode), a light-emitting layer, and a second electrode (e.g., a cathode electrode). The first electrode may be electrically connected to the second node N2 of the first transistor T1, and a base voltage VSS may be applied to the second electrode.

In the light-emitting element ED, the light-emitting layer may be an organic light-emitting layer including an organic material. In this case, the light-emitting element ED may be an organic light-emitting diode.

An on/off of the second transistor T2 is controlled by a scan signal SCAN applied through the gate line GL and the second transistor T2 may be electrically connected between the first node N1 of the first transistor T1 and the data line DL. The second transistor T2 may be referred to as a switching transistor.

When the second transistor T2 is turned on by the scan signal SCAN, the data voltage Vdata supplied through the data line DL is applied to the first node N1 of the first transistor T1.

The storage capacitor Cst may be electrically connected between the first node N1 and the second node N2 of the first transistor T1.

Each sub-pixel SP may have a 2T1C structure including two transistors T1 and T2 and one capacitor Cst. In some cases, each sub-pixel SP may further include one or more transistors or one or more capacitors.

The storage capacitor Cst may be an external capacitor intentionally designed outside the first transistor T1 rather than a parasitic capacitor that may be present between the first node N1 and the second node N2 of the first transistor T1.

The first transistor T1 and the second transistor T2 may each be an n-type transistor or a p-type transistor.

Meanwhile, circuit elements such as a light-emitting element ED, two or more transistors T1 and T2, and one or more storage capacitors Cst are disposed in the display panel 110. Since these circuit elements are vulnerable to external moisture or oxygen, an encapsulation layer ENCAP for preventing the external moisture or oxygen from infiltrating into the circuit elements may be disposed on the display panel 110.

In the touch display device 100 according to embodiments of the present disclosure, a touch screen panel TSP may be formed on the encapsulation layer ENCAP to be embedded in the display panel 110. That is, in the touch display device 100, a plurality of touch electrodes TE constituting the touch screen panel TSP may be disposed on the encapsulation layer ENCAP to configure the display panel 110.

The touch display device 100 uses a capacitance-based touch sensing method and may detect a touch using a mutual capacitance method or using a self capacitance method.

In the case of a mutual capacitance-based touch sensing method, the plurality of touch electrodes TE may include touch driving electrodes to which the touch driving signals are applied through touch driving lines, and touch sensing electrodes which detect touch sensing signals through touch sensing lines and form capacitance with the touch driving electrodes. In this case, the touch driving line and the touch sensing line may each be referred to as a touch line, and the touch driving signal and the touch sensing signal may each be referred to as a touch signal.

In this case, an area of the touch driving electrode to which the touch driving signal is applied and an area of the touch sensing electrode to which the touch sensing signal is applied may be equal or different.

For example, in order to relatively reduce parasitic capacitance due to the touch sensing electrode to which the touch sensing signal is applied, the area of the touch sensing electrode may be formed to be smaller than the area of the touch driving electrode. In this case, the area of the touch driving electrode to which the touch driving signal is applied and the area of the touch sensing electrode to which the touch sensing signal is applied may be formed at a ratio ranging from 5:1 to 2:1. As an example, the area of the touch driving electrode and the area of the touch sensing electrode may be formed at a ratio of 4:1.

In the case of the mutual capacitance-based touch sensing method, the presence or absence of a touch and touch coordinates are detected on the basis of a variation in mutual capacitance that occurs between the touch driving electrode and the touch sensing electrode according to the presence or absence of a pointer such as a finger or a pen.

In the case of the self capacitance-based touch sensing method, each touch electrode TE serves as both the touch driving electrode and the touch sensing electrode. That is, the touch driving signal is applied to the touch electrode TE through one touch line, and the touch sensing signal applied from the touch electrode TE to which the touch driving signal is applied is received through the same one touch line. Accordingly, in the self capacitance-based touch sensing method, there is no distinction between the touch driving electrode and the touch sensing electrode and between the touch driving line and the touch sensing line.

In the case of the self capacitance-based touch sensing method, the presence or absence of a touch and touch coordinates are detected on the basis of a variation in capacitance generated between a pointer, such as a finger or a pen, and the touch electrode TE.

As described above, the touch display device 100 may detect a touch using a mutual capacitance-based touch sensing method or detect a touch using a self capacitance-based touch sensing method.

Figure 3:
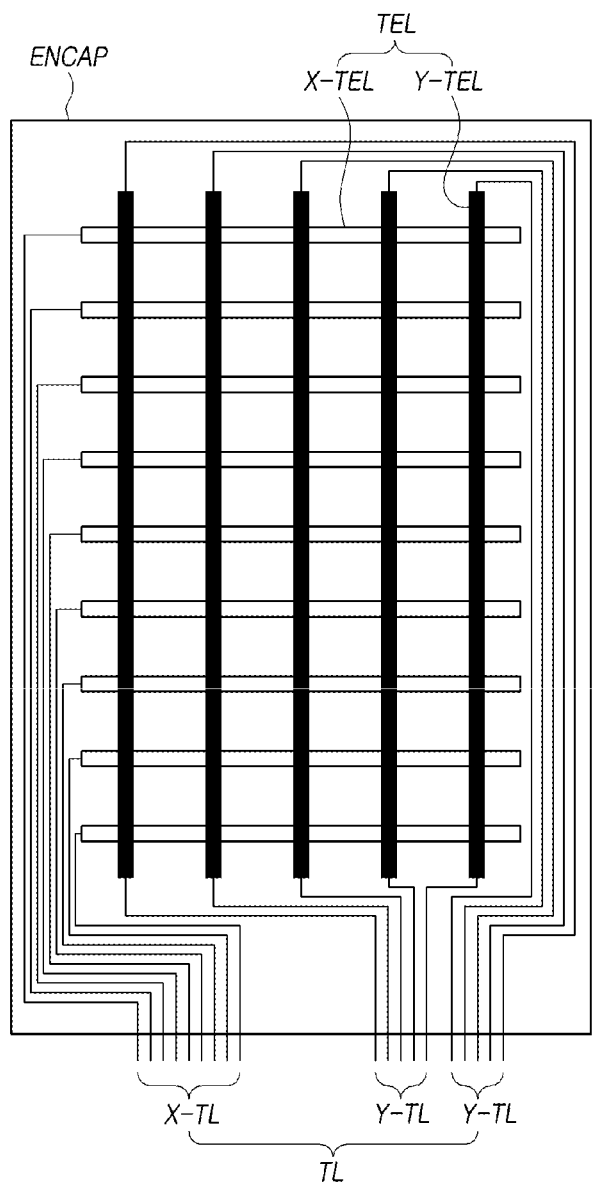
FIG. 3 is a diagram illustrating a touch sensing structure based on mutual capacitance in the touch display device according to one embodiment of the present disclosure.

FIG. 3 is an diagram illustrating a touch sensing structure based on mutual capacitance in the touch display device according to embodiments of the present disclosure.

Referring to FIG. 3, the mutual capacitance-based touch sensing structure in the touch display device 100 according to embodiments of the present disclosure may include a plurality of X-touch electrode lines X-TEL and a plurality of Y-touch electrode lines Y-TEL. Here, the plurality of X-touch electrode lines X-TEL and the plurality of Y-touch electrode lines Y-TEL may be located on the encapsulation layer ENCAP.

The plurality of X-touch electrode lines X-TEL may be disposed in a first direction, and the plurality of Y-touch electrode lines Y-TEL may be disposed in a second direction different from the first direction.

In the present disclosure, the first direction and the second direction may be different from each other. For example, the first direction may be an x-axis direction and the second direction may be a y-axis direction. Alternatively, the first direction may be the y-axis direction and the second direction may be the x-axis direction. In addition, the first direction and the second direction may be orthogonal to each other and may not be orthogonal to each other.

The plurality of X-touch electrode lines X-TEL may include a plurality of X-touch electrodes that are electrically connected, and the plurality of Y-touch electrode lines Y-TEL may include a plurality of Y-touch electrodes that are electrically connected.

Here, the plurality of X-touch electrodes and the plurality of Y-touch electrodes are included in the plurality of touch electrodes TE and are electrodes of which roles (functions) are distinguished. For example, the plurality of X-touch electrodes constituting the plurality of X-touch electrode lines X-TEL may be touch driving electrodes, and the plurality of Y-touch electrodes constituting the plurality of Y-touch electrode lines Y-TEL are touch sensing electrodes. In this case, the plurality of X-touch electrode lines X-TEL correspond to touch driving electrode lines, and the plurality of Y-touch electrode lines Y-TEL correspond to touch sensing electrode lines.

Alternatively, the plurality of X-touch electrodes constituting the plurality of X-touch electrode lines X-TEL may be the touch sensing electrodes, and the plurality of Y-touch electrodes constituting the plurality of Y-touch electrode lines Y-TEL may be the touch driving electrodes. In this case, the plurality of X-touch electrode lines X-TEL correspond to the touch sensing electrode lines, and the plurality of Y-touch electrode lines Y-TEL correspond to touch driving electrode lines.

In addition to the plurality of X-touch electrode lines X-TEL and the plurality of Y-touch electrode lines Y-TEL, a touch sensor metal for touch sensing may include a plurality of touch lines TL.

The plurality of touch lines TL may include one or more X-touch lines X-TL connected to the plurality of X-touch electrode lines X-TEL, and one or more Y-touch lines Y-TL connected to the plurality of Y-touch electrode lines Y-TEL.

Each of the plurality of X-touch electrode lines X-TEL may include the plurality of X-touch electrodes disposed in the same row (or column) and one or more X-touch electrode connection lines for electrically connecting the plurality of X-touch electrodes. Here, the X-touch electrode connection line connecting adjacent two X-touch electrodes may be a metal integrated with the adjacent two X-touch electrodes or a metal connected to the adjacent two X-touch electrodes through a contact hole.

The plurality of Y-touch electrode lines Y-TEL may include the plurality of Y-touch electrodes disposed in the same column (or row) and one or more Y-touch electrode connection lines for electrically connecting the plurality of Y-touch electrodes. Here, the Y-touch electrode connection line connecting adjacent two Y-touch electrodes may be a metal integrated with the adjacent two Y-touch electrodes or a metal connected to the adjacent two Y-touch electrodes through a contact hole.

In an area where the X-touch electrode line X-TEL and the Y-touch electrode line Y-TEL overlap (a touch electrode line overlap area), the X-touch electrode connection line and the Y-touch electrode connection line may overlap.

As described above, when the X-touch electrode connection line and the Y-touch electrode connection line overlap in the touch electrode line overlap area, the X-touch electrode connection line and the Y-touch electrode connection line may be located on different layers. Therefore, in order to dispose the plurality of X-touch electrode lines X-TEL and the plurality of Y-touch electrode lines Y-TEL to overlap, the plurality of X-touch electrodes, the plurality of X-touch electrode connection lines, the plurality of Y-touch electrodes, and the plurality of Y-touch electrode connection lines may be located in two or more layers.

The plurality of X-touch electrode lines X-TEL are electrically connected to a corresponding X-touch pad through one or more X-touch lines X-TL. That is, the outermost X-touch electrode among the plurality of X-touch electrodes included in one X-touch electrode line X-TEL is electrically connected to the corresponding X-touch pad through the X-touch line X-TL.

The plurality of Y-touch electrode lines Y-TEL are electrically connected to a corresponding Y-touch pad through one or more Y-touch lines Y-TL. That is, the outermost Y-touch electrode among the plurality of Y-touch electrodes included in one Y-touch electrode line Y-TEL is electrically connected to a corresponding Y-touch pad Y-TP (see FIG. 4) through the Y-touch lines Y-TL.

Here, when the plurality of X-touch electrodes constituting the plurality of X-touch electrode lines X-TEL are touch driving electrodes, touch driving signals are supplied to the plurality of X-touch electrodes through the plurality of X-touch lines X-TL. In addition, when the plurality of Y-touch electrodes constituting the plurality of Y-touch electrode lines Y-TEL are the touch sensing electrodes, the touch sensing signals generated by the plurality of Y-touch electrodes may be transmitted to the touch driving circuit 150 through the Y-touch lines Y-TL.

In this case, the plurality of X-touch lines X-TL and the plurality of Y-touch lines Y-TL may extend along a non-display area located at an outer periphery of the display area AA and may partially overlap in the non-display area.

For example, when the plurality of X-touch lines X-TL and the plurality of Y-touch lines Y-TL are formed on different layers in the non-display area, the plurality of X-touch lines X-TL and the plurality of Y-touch lines Y-TL may overlap in a partial section of the outer periphery of the display area AA.

In this case, in an area adjacent to the touch pad, the touch lines TL may be formed in a single electrode structure for transmitting a touch signal and may be formed in a double stacked structure in which the touch lines TL are connected through at least one contact hole in case of reduction of electrical resistance with respect to the touch signal and in case of disconnection.

When the touch lines TL are formed in the double stacked structure, touch bridge lines extending in the same direction as the touch lines TL may be located at vertical upper or lower positions of the touch lines TL, and one or more contact holes for connecting the touch bridge lines and the touch lines TL may be formed at regular intervals.

On the other hand, when the plurality of X-touch lines X-TL and the plurality of Y-touch lines Y-TL are formed on the same layer, there may be no overlapping area.

Figure 4:
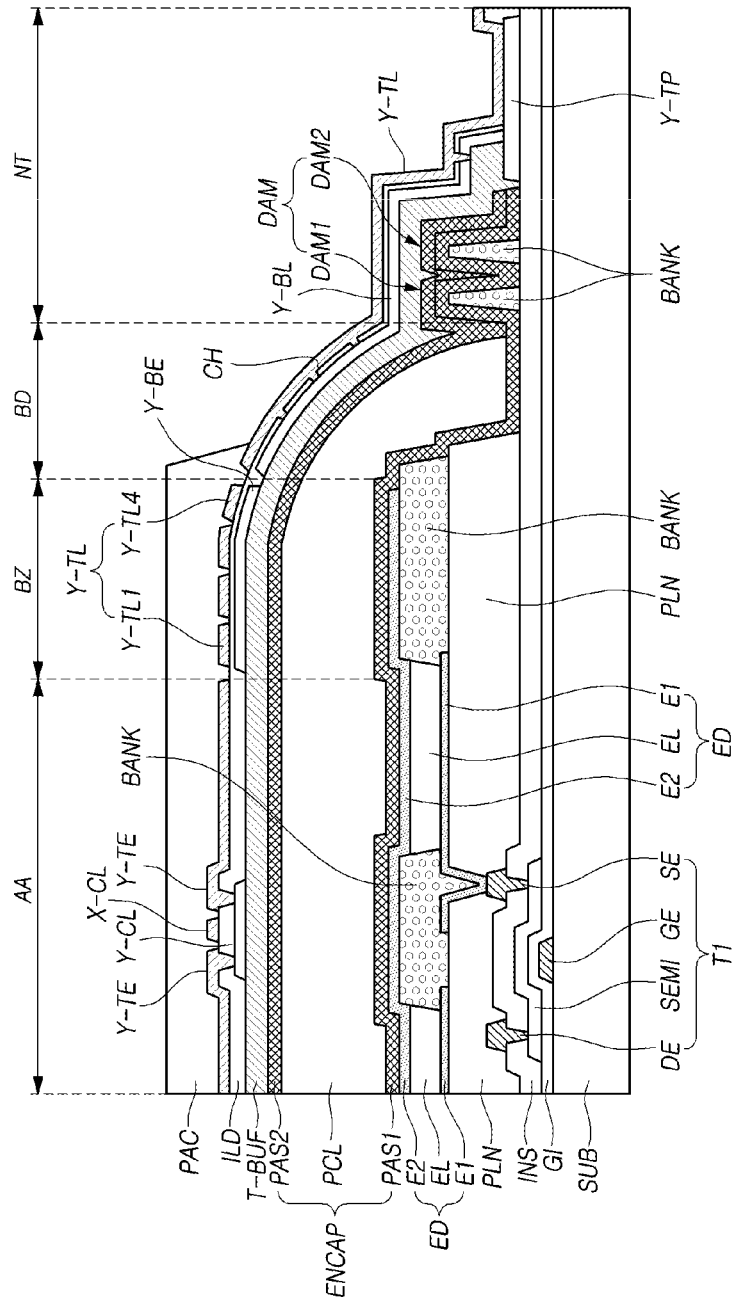
FIG. 4 is a diagram illustrating a cross section of the touch display device according to one embodiment of the present disclosure.

FIG. 4 is an diagram illustrating a cross section of the touch display device according to embodiments of the present disclosure.

However, although the Y-touch electrode Y-TE has been illustrated in a plate shape here, it is merely an example, and the Y-touch electrode Y-TE may be formed in a mesh shape.

Referring to FIG. 4, the first transistor T1, which is a driving transistor, may be disposed on the substrate SUB in the sub-pixel SP located within the display area AA in the touch display device 100 according to embodiments of the present disclosure.

The first transistor T1 may include a gate electrode GE, a source electrode SE, a drain electrode DE, and a semiconductor layer SEMI. In this case, the source electrode SE and the drain electrode DE may be made of the same material as a first node electrode N1 and a second node electrode N2 which are located in a bending area BD.

The gate electrode GE may overlap the semiconductor layer SEMI with a gate insulating layer GI interposed therebetween. The source electrode SE may be formed on an insulating layer INS to be in contact with one side of the semiconductor layer SEMI, and the drain electrode DE may be formed on the insulating layer INS to be in contact with the other side of the semiconductor layer SEMI.

The light-emitting element ED may include a first electrode E1 corresponding to an anode electrode (or a cathode electrode), a light emission layer EL formed on the first electrode E1, and a second electrode E2 corresponding to a cathode electrode (or an anode electrode) formed on the light emission layer EL.

The first electrode E1 is electrically connected to the source electrode SE of the first transistor T1, which is exposed through a contact hole passing through a planarization layer PLN.

The light emission layer EL is formed on the first electrode E1 of a light emission area laterally surrounded on at least four sides by a bank BANK. The light emission layer EL may be formed on the first electrode E1 by being stacked in the order of a hole-related layer, a light-emitting layer, and an electron-related layer or in the reverse order. The second electrode E2 may be formed opposite to the first electrode E1 with the light emission layer EL interposed therebetween.

The encapsulation layer ENCAP prevents external moisture or oxygen from infiltrating into the light-emitting element ED which is vulnerable to external moisture and oxygen. The encapsulation layer ENCAP may be formed of one layer, or alternatively, may be formed of a plurality of stacked structures PAS1, PCL, and PAS2.

For example, when the encapsulation layer ENCAP is formed of the plurality of stacked structures PAS1, PCL, and PAS2, the encapsulation layer ENCAP may include one or more inorganic encapsulation layers PAS1 and PAS2 and one or more organic encapsulation layers PCL. As a specific example, the encapsulation layer ENCAP may be formed by sequentially stacking the first inorganic encapsulation layer PAS1, the organic encapsulation layer PCL, and the second inorganic encapsulation layer PAS2.

Here, the organic encapsulation layer PCL may further include at least one organic encapsulation layer or at least one inorganic encapsulation layer.

The first inorganic encapsulation layer PAS1 is formed on the substrate SUB, on which the second electrode E2 corresponding to a cathode electrode is formed, so as to be closest to the light-emitting element ED. The first inorganic encapsulation layer PAS1 is formed of, for example, an inorganic insulating material, which may be deposited at a low temperature, such as silicon nitride ($SiN_x$), silicon oxide ($SiO_x$), silicon oxynitride (SiON), or aluminum oxide ($Al_2O_3$). Since the first inorganic encapsulation layer PAS1 is deposited in a low temperature atmosphere, the first inorganic encapsulation layer PAS1 may prevent damage to the light emission layer EL, which includes an organic material which is vulnerable to a high temperature atmosphere, during a deposition process.

The organic encapsulation layer PCL may be formed to have an area that is smaller than an area of the first inorganic encapsulation layer PAS1. In this case, the organic encapsulation layer PCL may be formed to expose both ends of the first inorganic encapsulation layer PAS1. The organic encapsulation layer PCL may serve as a buffer for reducing stress between layers due to bending of the touch display device, which is an organic light-emitting display device, and may serve to enhance planarization performance. The organic encapsulation layer PCL may be formed of, for example, an organic insulating material such as an acrylic resin, an epoxy resin, polyimide, polyethylene, or silicon oxycarbon (SiOC).

Meanwhile, when the organic encapsulation layer PCL is formed through an inkjet method, one or more dams DAM may be formed in a boundary area between the non-display area and the display area AA or in a dam area corresponding to a partial area within the non-display area.

For example, the dam area is located between the display area AA and the pad area in which the plurality of touch pads TP are formed in the non-display area. A primary dam DAM1 adjacent to the display area AA and a secondary dam DAM2 adjacent to the pad area may be present in the dam area.

The one or more dams DAM disposed in the dam area may prevent the organic encapsulation layer PCL in the form of a liquid phase from collapsing in a direction toward the non-display area to invade the pad area when the organic encapsulation layer PCL in the form of a liquid phase is loaded in the display area AA.

The primary dam DAM1 or the secondary dam DAM2 may be formed in a single-layer structure or a multi-layer structure. For example, the primary dam DAM1 or the secondary dam DAM2 may be simultaneously formed of the same material as at least one of the bank BANK and a spacer (not shown). In this case, the dam structure may be formed without an additional mask process and without an increase in cost.

In addition, the primary dam DAM1 or the secondary dam DAM2 may be formed in a structure in which the first inorganic encapsulation layer PAS1 and the second inorganic encapsulation layer PAS2 are stacked on the bank BANK. In this case, the organic encapsulation layer PCL including an organic material may be located on an inner surface of the primary dam DAM1 or may be located on at least an upper portion of the primary dam DAM1 and the secondary dam DAM2.

The second inorganic encapsulation layer PAS2 may be formed to cover an upper surface and side surfaces of each of the organic encapsulation layer PCL and the first inorganic encapsulation layer PAS1 on the substrate SUB on which the organic encapsulation layer PCL is formed. The second inorganic encapsulation layer PAS2 minimizes, reduces or prevents external moisture or oxygen from infiltrating into the first inorganic encapsulation layer PAS1 and the organic encapsulation layer PCL. The second inorganic encapsulation layer PAS2 is formed of, for example, an inorganic insulating material, which may be deposited at a low temperature, such as $SiN_x$, $SiO_x$, SiON, or $Al_2O_3$.

A touch buffer layer T-BUF may be disposed on the encapsulation layer ENCAP. The touch buffer layer T-BUF may be located between the touch sensor metal, which includes the touch electrodes X-TE and Y-TE and the touch electrode connection lines X-CL and Y-CL, and the second electrode E2 of the light-emitting element ED.

The touch buffer layer T-BUF may be designed to allow a separation distance between the touch sensor metal and the second electrode E2 of the light-emitting element ED to be maintained by a predetermined or selected minimum or reduced separation distance (e.g., 1 μm). Accordingly, it is possible to reduce or prevent a parasitic capacitance formed between the touch sensor metal and the second electrode E2 of the light-emitting element ED. In this way, it is possible to prevent degradation in touch sensitivity due to the parasitic capacitance.

Alternatively, without the touch buffer layer T-BUF, a touch sensor metal including the touch electrodes X-TE and Y-TE and the touch electrode connection lines X-CL and Y-CL may be disposed on the encapsulation layer ENCAP.

In addition, the touch buffer layer T-BUF may prevent a liquid chemical (a developer or an etchant) used in a manufacturing process of the touch sensor metal disposed on the touch buffer layer T-BUF or external moisture from infiltrating into the light emission layer EL including an organic material. Accordingly, the touch buffer layer T-BUF may prevent damage to the light emission layer EL which is vulnerable to a liquid chemical or moisture.

In order to prevent damage to the light emission layer EL which includes an organic material vulnerable to a high temperature, the touch buffer layer T-BUF may be formed of an organic insulating material which is formed at a low temperature that is lower than or equal to a predetermined or selected temperature (e.g., 100° C.) and which has a low dielectric constant. For example, the touch buffer layer T-BUF may be formed of an acrylic-based material, an epoxy-based material, or a siloxan-based material. The touch buffer layer T-BUF, which is formed of an organic insulating material and has a planarization characteristic, may prevent damage to the inner layers PAS1, PCL, and PAS2 constituting the encapsulation layer ENCAP due to bending of the organic light emitting display device and prevent breaking of the touch sensor metal formed on the touch buffer layer T-BUF.

In the case of the mutual capacitance-based touch sensing structure, the X-touch electrode line X-TEL and the Y-touch electrode line Y-TEL are disposed on the touch buffer layer T-BUF, and the X-touch electrode lines X-TEL and the Y-touch electrode line Y-TEL may be disposed to overlap each other. The Y-touch electrode line Y-TEL may include the plurality of Y-touch electrode connection lines Y-CL for electrically connecting the plurality of Y-touch electrodes Y-TE.

In this case, the plurality of Y-touch electrodes Y-TE and the plurality of Y-touch electrode connection lines Y-CL may be located on different layers with an interlayer dielectric ILD interposed therebetween.

The plurality of Y-touch electrodes Y-TE may be spaced a regular interval from each other in the y-axis direction. The plurality of Y-touch electrodes Y-TE may be electrically connected to other Y-touch electrodes Y-TE adjacent thereto in the y-axis direction through the Y-touch electrode connection line Y-CL.

The Y-touch electrode connection line Y-CL may be formed on the touch buffer layer T-BUF and exposed through a touch contact hole passing through the interlayer dielectric ILD to be electrically connected to two Y-touch electrodes Y-TE adjacent thereto in the y-axis direction.

The Y-touch electrode connection line Y-CL may be disposed to overlap the bank BANK. Accordingly, it is possible to prevent degradation in aperture ratio due to the Y-touch electrode connection line Y-CL.

The X-touch electrode line X-TEL may include the plurality of X-touch electrode connection lines X-CL for electrically connecting the plurality of X-touch electrodes X-TE. The plurality of X-touch electrodes X-TE and the plurality of X-touch electrode connection lines X-CL may be located on different layers with the interlayer dielectric ILD interposed therebetween.

The plurality of X-touch electrodes X-TE may be spaced a regular interval from each other on the interlayer dielectric ILD in the x-axis direction. The plurality of X-touch electrodes X-TE may be electrically connected to other X-touch electrodes X-TE adjacent thereto in the x-axis direction through the X-touch electrode connection line X-CL.

The X-touch electrode connection line X-CL may be disposed coplanar with the X-touch electrode X-TE to be electrically connected to two X-touch electrodes X-TE adjacent thereto in the x-axis direction without a separate contact hole or to be integrated with the two X-touch electrodes X-TE adjacent thereto in the x-axis direction.

The X-touch electrode connection line X-CL may be disposed to overlap the bank BANK. Accordingly, it is possible to prevent degradation in aperture ratio due to the X-touch electrode connection line X-CL.

Meanwhile, the Y-touch electrode line Y-TEL may be electrically connected to the touch driving circuit 150 through the Y-touch line Y-TL and the Y-touch pad Y-TP. Similarly, the X-touch electrode line X-TEL may be electrically connected to the touch driving circuit 150 through the X-touch line X-TL and the X-touch pad X-TP.

In this case, a pad cover electrode covering the X-touch pad X-TP and the Y-touch pad Y-TP may be further disposed.

The X-touch pad X-TP may be separately formed from the X-touch line X-TL or may be formed to extend from the X-touch line X-TL. The Y-touch pad Y-TP may be separately formed from the Y-touch line Y-TL or may be formed to extend from the Y-touch line Y-TL.

When the X-touch pad X-TP is formed to extend from the X-touch line X-TL and the Y-touch pad Y-TP is formed to extend from the Y-touch line Y-TL, the X-touch pad X-TP, X-touch line X-TL, Y-touch pad Y-TP, and Y-touch line Y-TL may be made of the same first conductive material. Here, the first conductive material may be formed in a single-layer structure or multi-layer structure using a metal having high corrosion resistance, high acid resistance, and good conductivity, for example, Al, Ti, Cu, or Mo.

For example, the X-touch pad X-TP, the X-touch line X-TL, the Y-touch pad Y-TP, and the Y-touch line Y-TL, which are each made of a first conductive material, may be formed in a stacked three-layer structure such as Ti/Al/Ti or Mo/Al/Mo.

The pad cover electrode capable of covering the X-touch pad X-TP and the Y-touch pad Y-TP may be made of a second conductive material which is the same material as the X-touch electrodes X-TE and Y-touch electrodes Y-TE. Here, the second conductive material may be made of a transparent conductive material such as indium tin oxide (ITO) or indium zinc oxide (IZO) with high corrosion resistance and high acid resistance. Since the pad cover electrode is formed to be exposed by the touch buffer layer T-BUF, the pad cover electrode may be bonded to the touch driving circuit 150 or bonded to a circuit film on which the touch driving circuit 150 is mounted.

Here, the touch buffer layer T-BUF may be formed to cover the touch sensor metal to prevent corrosion of the touch sensor metal due to external moisture. For example, the touch buffer layer T-BUF may be formed of an organic insulating material or formed in the form of a film of a circularly polarizing plate or a film of an epoxy or acrylic material. The touch buffer layer T-BUF may not be present on the encapsulation layer ENCAP. That is, the touch buffer layer T-BUF may not be an essential component (e.g., may be an optional element).

The Y-touch line Y-TL may be electrically connected to the Y-touch electrode Y-TE through a touch line contact hole or may be integrated with the Y-touch electrode Y-TE.

The Y-touch line Y-TL may be electrically connected to the Y-touch pad Y-TP by extending to the non-display area to pass through an upper portion and side surfaces of each of the encapsulation layer ENCAP and the dam DAM.

Accordingly, the Y-touch line Y-TL may be electrically connected to the touch driving circuit 150 through the Y-touch pad Y-TP.

The Y-touch line Y-TL may transmit the touch sensing signal from the Y-touch electrode Y-TE to the touch driving circuit 150 or receive the touch driving signal from the touch driving circuit 150 and transmit the touch driving signal to the Y-touch electrode Y-TE.

In this case, a Y-touch bridge line Y-BL connected through a contact hole CH may be disposed below the Y-touch line Y-TL in a notched area NT and the bending area BD. Since the Y-touch line Y-TL and the Y-touch bridge line Y-BL are electrically connected through at least one contact hole CH formed at a regular interval, the same touch driving signal or the touch sensing signal may be transmitted.

In this way, when the Y-touch line Y-TL and the Y-touch bridge line Y-BL are electrically connected, electrical resistance may be reduced in a process of transmitting the touch driving signal or the touch sensing signal. In addition, when the Y-touch line Y-TL and the Y-touch bridge line Y-BL are connected through a plurality of contact hole CH, even when disconnection in some sections of the Y-touch line Y-TL or the Y-touch bridge line Y-BL occurs, a touch signal (the touch driving signal or the touch sensing signal) may bypass the disconnection through the contact holes CH so that the performance of touch sensing may be maintained.

An area between the Y-touch line Y-TL and the Y-touch bridge line Y-BL, excluding the contact holes CH, may be insulated due to the interlayer dielectric ILD disposed therebetween.

Meanwhile, a plurality of Y-touch lines Y-TL1, Y-TL2, Y-TL3, and Y-TL4 may be disposed in the bezel area BZ, and a Y-touch bridge electrode Y-BE having an integrated structure may be disposed below the plurality of Y-touch lines Y-TL1, Y-TL2, Y-TL3, and Y-TL4.

The Y-touch bridge electrode Y-BE may be formed in an integrated structure and formed to have a width that is greater than or equal to widths of the Y-touch lines Y-TL1, Y-TL2, Y-TL3, and Y-TL4 so as to cover an area occupied by the Y-touch lines Y-TL1, Y-TL2, Y-TL3, and Y-TL4 located above the Y-touch bridge electrode Y-BE.

In this case, the Y-touch bridge electrode Y-BE is connected to a ground voltage GND so as to discharge noise charge flowing into the display panel 110 and is separated from the Y-touch bridge line Y-BL or the second node electrode N2, which is located in the bending area BD.

In this way, due to the Y-touch bridge electrode Y-BE formed in an integrated structure so as to cover the area occupied by the Y-touch lines Y-TL1, Y-TL2, Y-TL3, and Y-TL4, the noise charge flowing into the display panel 110 is easily discharged to the ground voltage GND so that the touch sensing performance of the touch display device 100 can be improved and defects due to driving of the display can be reduced.

Meanwhile, the X-touch line X-TL may be electrically connected to the X-touch electrode X-TE through the touch contact hole or may be integrated with the X-touch electrode X-TE.

The X-touch line X-TL may be electrically connected to the X-touch pad X-TP by extending to the non-display area to pass through an upper portion and side surfaces of each of the encapsulation layer ENCAP and the dam DAM. Accordingly, the X-touch line X-TL may be electrically connected to the touch driving circuit 150 through the X-touch pad X-TP.

The X-touch line X-TL may receive the touch driving signal from the touch driving circuit 150 to transmit the touch driving signal to the X-touch electrode X-TE and may transmit the touch sensing signal from the X-touch electrode X-TE to the touch driving circuit 150.

The arrangement of the X-touch line X-TL and the Y-touch line Y-TL may be variously changed according to a design strategy of the display panel 110.

Meanwhile, a touch protection layer PAC may be disposed on the X-touch electrode X-TE and the Y-touch electrode Y-TE. The touch protection layer PAC may extend to a front portion or a rear portion of the dam DAM to be disposed on the X-touch line X-TL and the Y-touch line Y-TL.

Meanwhile, the cross-sectional view shown herein conceptually illustrates the structure of the touch display device 100, and a position, a thickness, or a width of each pattern (each of various layers or various electrodes) may be varied according to a viewing direction or a viewing position, and a connection structure of various patterns may also be changed. In addition to the plurality of illustrated layers, additional layers may be further present, and some of the plurality of illustrated layers may be omitted or integrated. For example, a width of the bank BANK may be smaller than that shown in drawing, and the dam DAM may be lower or higher than that shown in the drawing.

The touch display device 100 may be used in a mobile device such as a smart phone or a tablet PC or may be used in a large-screen display device such as a display for a vehicle and a display for exhibition.

The touch display device 100 may determine the presence or location of a touch by detecting a touch sensing signal transmitted from the touch electrode TE in a single sensing method or a differential sensing method.

Figure 5:
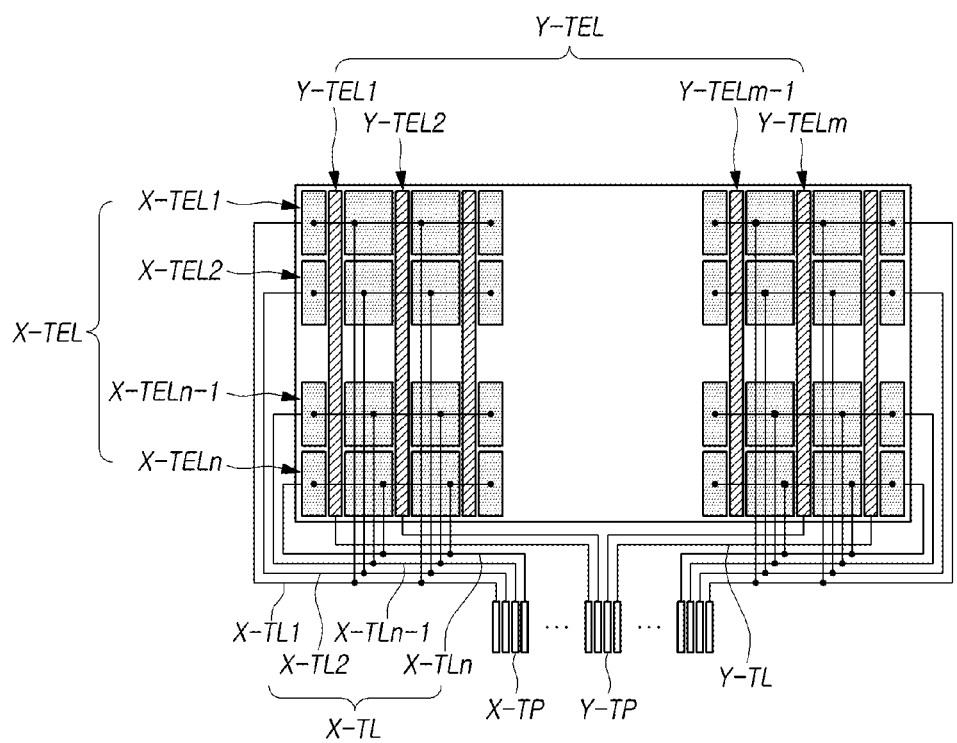
FIG. 5 is a diagram illustrating a display panel in which a plurality of touch lines are connected to a plurality of touch electrodes in the touch display device according to one embodiment of the present disclosure.

FIG. 5 is an diagram illustrating a display panel in which a plurality of touch lines are connected to a plurality of touch electrodes in the touch display device according to embodiments of the present disclosure.

Referring to FIG. 5, in the touch display device 100 according to embodiments of the present disclosure, in order to reduce a time delay of the touch signal, the touch lines may be connected in a multi-feeding structure so as to allow the touch signal to be simultaneously applied to a plurality of touch electrodes constituting the same touch electrode line TEL.

For example, when a plurality of X-touch electrodes disposed in the x-axis direction constitute one X-touch electrode line X-TEL, in order to simultaneously apply a touch signal to the plurality of X-touch electrodes constituting the one X-touch electrode line X-TEL, a plurality of X-touch electrodes located on the same line may be connected through the X-touch electrode connection line X-CL to supply the same touch signal.

Alternatively, when a plurality of Y-touch electrodes disposed in the y-axis direction constitute one Y-touch electrode line Y-TEL, in order to simultaneously apply a touch signal to the plurality of Y-touch electrodes constituting one Y-touch electrode line Y-TEL, the plurality of Y-touch electrodes may be connected through the same Y-touch electrode connection line Y-CL.

Here, an example in which the X-touch electrode line X-TEL in the x-axis direction is formed of the plurality of X-touch electrodes, and the Y-touch electrode line Y-TEL in the y-axis direction is formed of one Y-touch electrode is illustrated. Accordingly, a plurality of X-touch electrodes disposed in the same row in the x-axis direction are connected through the X-touch electrode connection line X-CL so that the same touch signal may be supplied.

For example, a first X-touch electrode line X-TEL1 is formed of a plurality of X-touch electrodes disposed in a first row, and the plurality of X-touch electrodes located in the first row are each electrically connected to a first branching X-touch line X-TL1 so that first touch signals may be simultaneously transmitted.

Accordingly, since touch signals are simultaneously applied to the plurality of X-touch electrodes disposed in the x-axis direction, delays of the touch signals to the plurality of X-touch electrodes are reduced so that the performance of touch on the entire screen of the display panel 110 may be uniform.

For example, when the plurality of X-touch electrodes disposed in the x-axis direction are touch driving electrodes, the plurality of X-touch electrodes constituting one X-touch electrode line X-TEL may be electrically connected by the same X-touch line X-TL, and the same touch driving signal may be applied at the same timing.

The plurality of X-touch electrode lines X-TEL1, ..., X-TELn may be electrically connected to corresponding X-touch pads X-TP through the X-touch lines X-TL1, ..., X-TLn. For example, the plurality of X-touch electrodes included in the first X-touch electrode line X-TEL1 may be electrically connected to a corresponding X-touch pad X-TP through the first X-touch line X-TL1.

On the other hand, since the Y-touch electrode lines Y-TEL1, ..., Y-TELm are each formed of one Y-touch electrode, the Y-touch electrode lines Y-TEL1, ..., Y-TELm may be electrically connected to corresponding Y-touch pads Y-TP through the one Y-touch line Y-TL.

In this case, in order to connect one touch line to the plurality of touch electrodes constituting the same touch electrode line TEL, a structure in which one touch line branches may be variously changed.

Figure 6:
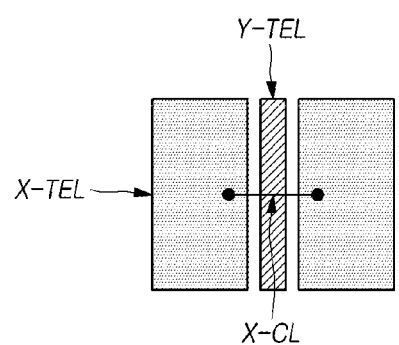
FIGS. 6 and 7 are diagrams illustrating various structures of the touch electrode line in the touch display device according to one embodiment of the present disclosure.
Figure 7:
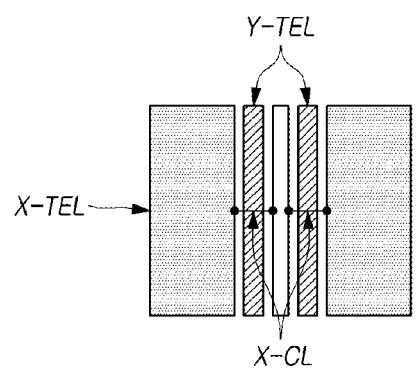

FIGS. 6 and 7 are diagrams illustrating various structures of the touch electrode line in the touch display device according to embodiments of the present disclosure.

Referring to FIGS. 6 and 7, the touch display device 100 according to embodiments of the present disclosure may include touch electrode lines X-TEL and Y-TEL having various structures.

For example, as shown in FIG. 6, in the touch display device 100 according to embodiment of the present disclosure, based on the Y-touch electrode line Y-TEL with a single bar structure extending in the y-axis direction, X-touch electrode lines X-TEL may be formed on both sides of the x-axis direction by X-touch electrodes X-TE having the same shape.

Alternatively, as shown in FIG. 7, a Y-touch electrode line Y-TEL formed of two bars may be formed in a split structure with the X-touch electrode line having a thin structure interposed between the two bars, and based on the Y-touch electrode line Y-TEL with the two-bar structure, X-touch electrode lines X-TEL may be formed on both sides of the x-axis direction by X-touch electrodes X-TE having the same shape.

In this case, the X-touch electrode lines X-TEL separated by the Y-touch electrode line Y-TEL may be connected through the X-touch electrode connection line X-CL.

Meanwhile, an area of the X-touch electrode line X-TEL to which the touch driving signal is applied and an area of the Y-touch electrode line Y-TEL to which the touch sensing signal is transmitted may be equal or different.

For example, when it is desired to relatively reduce parasitic capacitance due to the Y-touch electrode line Y-TEL through which the touch sensing signal is transmitted, the area of the Y-touch electrode line Y-TEL may be formed to be smaller than the area of the X-touch electrode line X-TEL. In this case, the area of the X-touch electrode line X-TEL to which the touch driving signal is applied and the area of the Y-touch electrode line Y-TEL to which the touch sensing signal is transmitted may be formed at a ratio ranging from 5:1 to 2:1. As an example, the area of the X-touch electrode line X-TEL and the area of the Y-touch electrode line Y-TEL may be formed at a ratio of 4:1.

The structures of the touch electrode lines X-TEL and Y-TEL may be variously changed according to the size or use of the touch display device 100.

Figure 8:
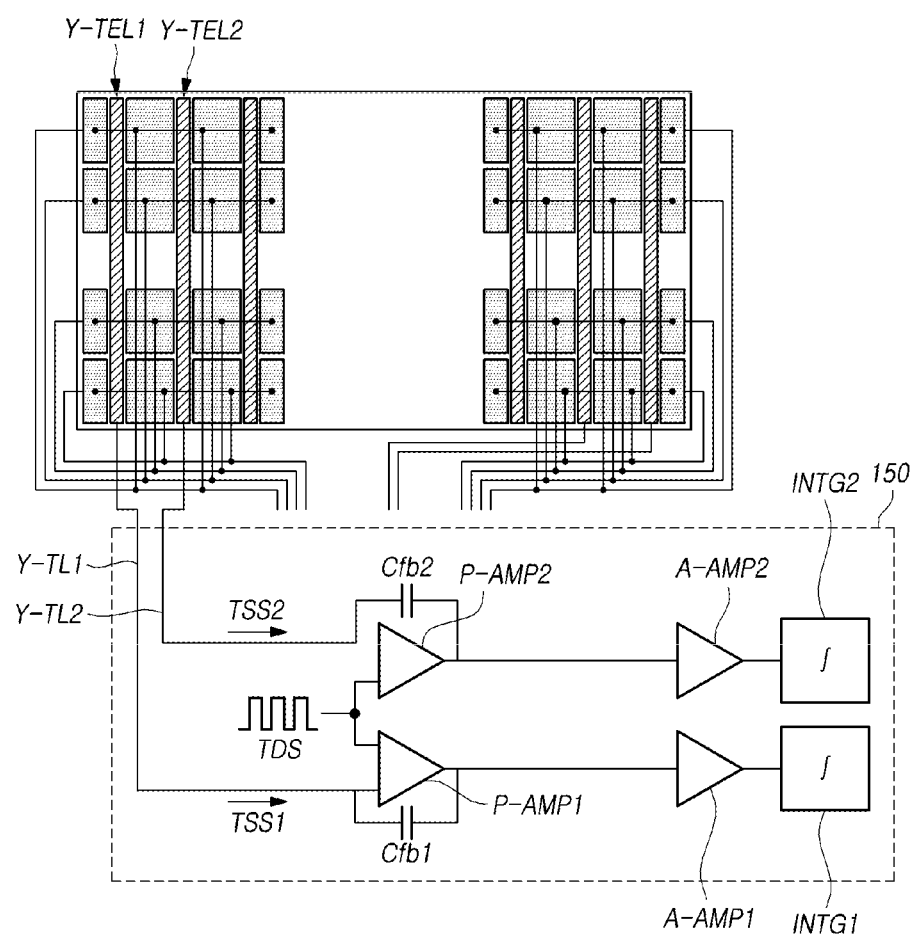
FIG. 8 is a diagram illustrating a single sensing type touch driving circuit in the touch display device according to one embodiment of the present disclosure.

FIG. 8 is an diagram illustrating a single sensing type touch driving circuit in the touch display device according to embodiments of the present disclosure.

Referring to FIG. 8, the touch display device 100 according to embodiments of the present disclosure may sequentially or simultaneously drive the plurality of touch electrodes TE and may separately sense the plurality of touch electrodes TE.

As described above, a method of separately sensing the plurality of touch electrodes TE is referred to as a single sensing method or a single ended method.

For example, the first Y-touch electrode line Y-TEL1 and the second Y-touch electrode line Y-TEL2, which are disposed in the display panel 110, may be electrically connected to the touch driving circuit 150 through the first Y-touch line Y-TL1 and the second Y-touch line Y-TL2.

The touch driving circuit 150 may include a sensing unit or circuitry for the first Y-touch electrode line Y-TEL1 and a sensing unit for the second Y-touch electrode line Y-TEL2.

As the sensing unit for the first Y-touch electrode line Y-TEL1, the touch driving circuit 150 may include a first pre-amplifier P-AMP1 which receives a first touch sensing signal TSS1 through the first Y-touch line Y-TL1, an amplifier A-AMP1 for amplifying a signal output from the first pre-amplifier P-AMP1, and a first integrator $INTG_1$ for integrating a signal output from the amplifier A-AMP1.

In addition, as the sensing unit for the second Y-touch electrode line Y-TEL2, the touch driving circuit 150 may include a second pre-amplifier P-AMP2 which receives a second touch sensing signal TSS2 through the second Y-touch line Y-TL2, an amplifier A-AMP2 for amplifying a signal output from the second pre-amplifier P-AMP2, and a second integrator $INTG_2$ for integrating a signal output from the amplifier A-AMP2.

The first pre-amplifier P-AMP1 may include a non-inverted input terminal which receives a touch driving signal TDS, an inverted input terminal which receives the first touch sensing signal TSS1 from the first Y-touch line Y-TL1, and an output terminal which outputs the first touch sensing signal TSS1 or a signal corresponding thereto.

A feedback capacitor Cfb1 may be connected between the inverted input terminal and the output terminal of the first pre-amplifier P-AMP1.

The second pre-amplifier P-AMP2 may include a non-inverted input terminal which receives the touch driving signal TDS, an inverted input terminal which receives the second touch sensing signal TSS2 from the second Y-touch line Y-TL2, and an output terminal which outputs the second touch sensing signal TSS2 or a signal corresponding thereto.

A feedback capacitor Cfb2 may be connected between the inverted input terminal and the output terminal of the second pre-amplifier P-AMP2.

The sensing unit for the first Y-touch electrode line Y-TEL1 may be different from the sensing unit for the second Y-touch electrode line Y-TEL2. Alternatively, when the first Y-touch electrode line Y-TEL1 and the second Y-touch electrode line Y-TEL2 are sensed at different times, the sensing unit for the first Y-touch electrode line Y-TEL1 and the sensing unit for the second Y-touch electrode line Y-TEL2 may be the same sensing unit.

Figure 9:
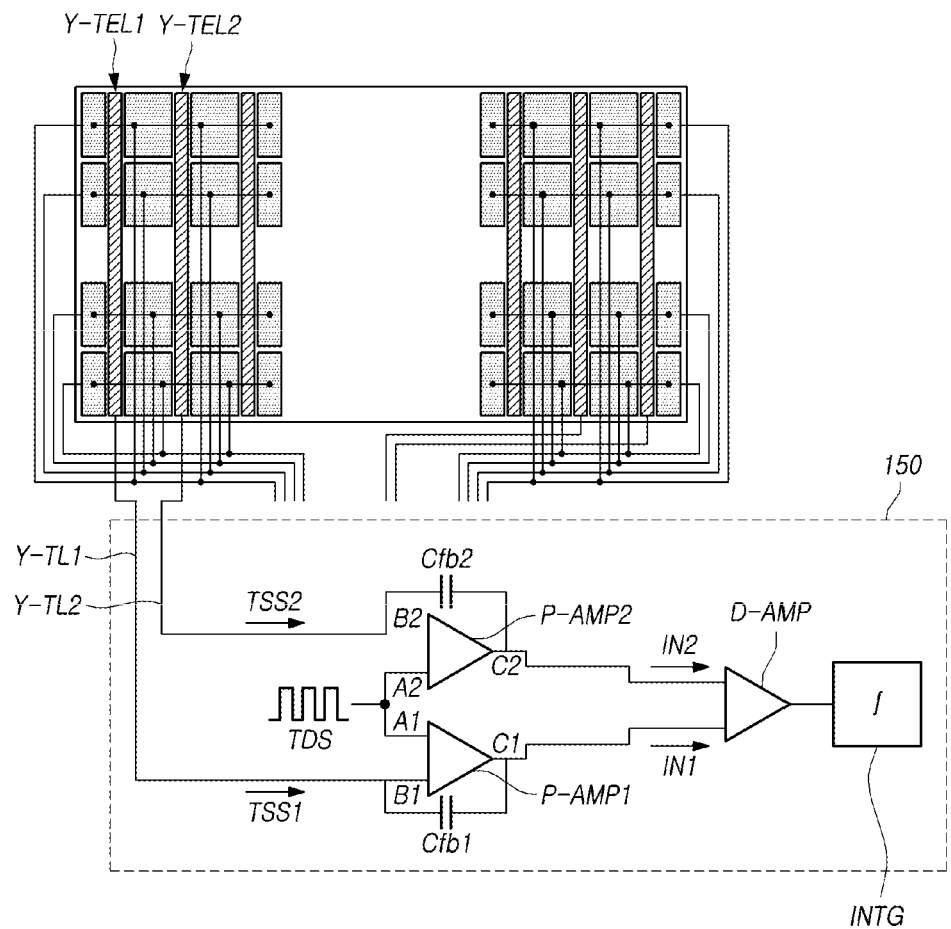
FIG. 9 is a diagram illustrating a differential sensing type touch driving circuit in the touch display device according to one embodiment of the present disclosure.

FIG. 9 is an diagram illustrating a differential sensing type touch driving circuit in the touch display device according to embodiments of the present disclosure.

Referring to FIG. 9, in the touch display device 100 according to embodiments of the present disclosure, the touch driving circuit 150 may receive two or more sensing signals TSS1 and TSS2 from two or more corresponding Y-touch electrode lines Y-TEL1 and Y-TEL2 through two or more Y-touch lines Y-TL1 and Y-TL2 among the plurality of touch lines TL.

The touch driving circuit 150 may include a differential amplifier D-AMP which is electrically connected to the first Y-touch line Y-TL1 and the second Y-touch line Y-TL2 among the plurality of touch lines TL. For example, during a display driving period in which data voltages Vdata are applied to the plurality of data lines DL, the differential amplifier D-AMP may generate an output signal proportional (e.g., positively or directly proportional) to a difference between the first touch sensing signal TSS1 received from the first Y-touch electrode line Y-TEL1 through the first Y-touch line Y-TL1 among the plurality of touch lines TL and the second touch sensing signal TSS2 received from the second Y-touch electrode line Y-TEL2 through the second Y-touch line Y-TL2 among the plurality of touch lines TL.

The touch driving circuit 150 may further include an integrator INTG for integrating an output signal transmitted from the differential amplifier D-AMP or integrating a signal in which the output signal is processed (e.g., a signal in which the output signal is amplified).

An integral value output from the integrator INTG may be a value proportional to the difference between the first touch sensing signal TSS1 and the second touch sensing signal TSS2.

In this way, by differentially sensing the two Y-touch electrode lines Y-TEL1 and Y-TEL2, the two Y-touch electrode lines Y-TEL1 and Y-TEL2 may perform touch sensing by removing a noise component received from the data line DL or the gate line GL.

That is, it is possible to remove an influence of the touch sensing driving due to the display driving. In this way, time-free driving in which the display driving and the touch sensing driving are simultaneously performed may be performed normally. Accordingly, since it is possible to secure as much display driving time as possible and sufficiently secure a pixel charging time, a high resolution display may be implemented.

In this case, the touch driving circuit 150 may further include a first pre-amplifier P-AMP1 which receives the first touch sensing signal TSS1 through the first Y-touch line Y-TL1 among the plurality of Y-touch lines Y-TL and transmits a first input signal IN1 to a differential amplifier D-AMP, and a second pre-amplifier P-AMP2 which receives the second touch sensing signal TSS2 through the second Y-touch line Y-TL2 among the plurality of Y-touch lines Y-TL and transmits a second input signal IN2 to a differential amplifier D-AMP.

In this way, the first pre-amplifier P-AMP1 and the second pre-amplifier P-AMP2 are additionally disposed, and thus it is possible to prevent signal attenuation and degradation of a signal-to-noise ratio (SNR) due to noise. Thus, a signal transmitted from each of the first Y-touch electrode line Y-TEL1 and the second Y-touch electrode line Y-TEL2 may be more accurately detected.

However, in the display panel 110 of the touch display device 100, the touch electrode TE disposed in a central area has a square structure, whereas the touch electrode TE of the non-square area having a non-square structure exhibits a non-uniform area.

Figure 10:
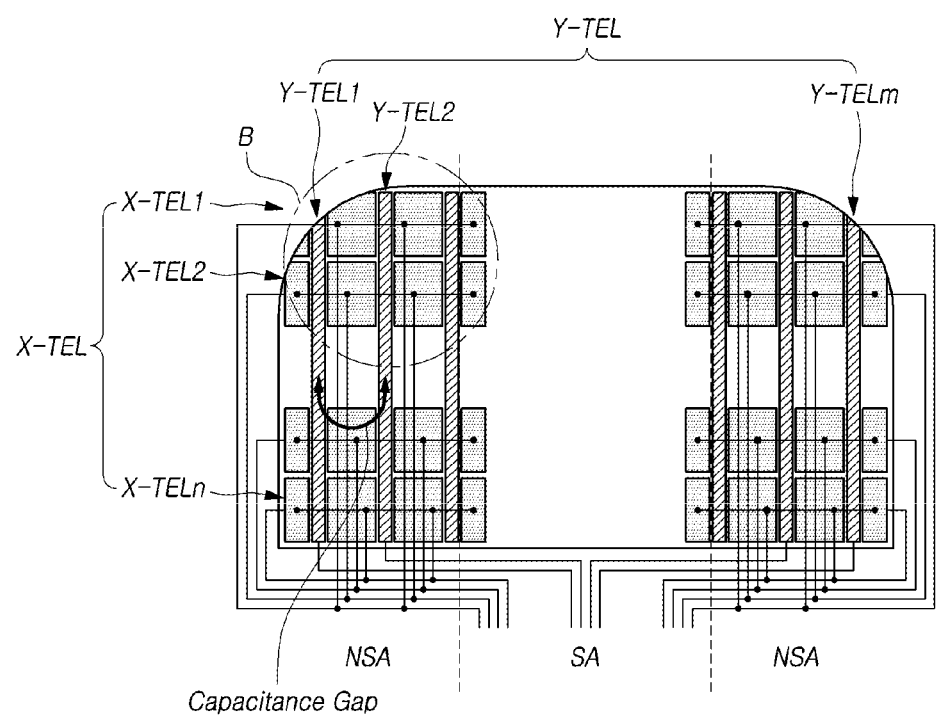
FIG. 10 is a diagram illustrating an example of a structure of a touch electrode disposed in a non-square display panel.
Figure 11:
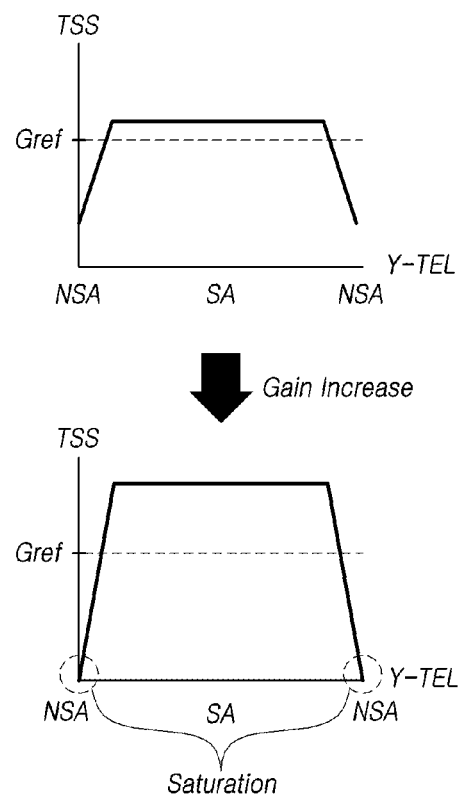
FIG. 11 is a diagram illustrating a signal waveform when an amplification gain of a touch sensing signal detected from a non-square display panel is increased.

FIG. 10 is a diagram illustrating an example of a structure of a touch electrode disposed in a non-square display panel, and FIG. 11 is an diagram illustrating a signal waveform when an amplification gain of a touch sensing signal detected from a non-square display panel is increased.

Referring to FIG. 10, the touch display device 100 may operate in a mutual capacitance method in which the touch driving signal TDS is applied to the plurality of X-touch electrode lines X-TEL extending in the x-axis direction, and the touch sensing signal TSS is transmitted from the plurality of Y-touch electrode lines Y-TEL extending in the y-axis direction.

In this case, since the plurality of X-touch electrode lines X-TEL and the plurality of Y-touch electrode lines Y-TEL are disposed in parallel with each other at regular intervals, the entirety of the touch display device 100 may have a square structure.

In this case, when the display panel 110 has a non-square structure, the central area of the display panel 110 corresponds to a square area SA in which the X-touch electrode line X-TEL and the Y-touch electrode line Y-TEL are formed in a square shape. However, since some of the outer areas have a curved structure, the X-touch electrode line X-TEL and the Y-touch electrode line Y-TEL are not formed in a square shape and correspond to a non-square area NSA formed along a curved structure.

For example, when the first Y-touch electrode line Y-TEL1 and the second Y-touch electrode line Y-TEL2 are located in the non-square area NSA, an area where the first Y-touch electrode line Y-TEL1 is located in the display panel 110 may be different from an area where the second Y-touch electrode line Y-TEL2 is located in the display panel 110. In this case, a difference in capacitance or capacitance gap occurs between the first Y-touch electrode line Y-TEL1 and the second Y-touch electrode line Y-TEL2.

In the above state, when a gain increases than a reference gain $G_{ref}$ in a process of performing single sensing or differential sensing, as shown in FIG. 8, although the touch sensing signal TSS of the square area SA may increase, the touch sensing signal TSS of the non-square area NSA may increase in an opposite direction to reach a saturation state.

That is, when the touch sensing signal TSS is amplified by the pre-amplifier P-AMP or the differential amplifier D-AMP, the touch sensing signal TSS detected in the non-square area NSA is saturated, and thus a problem in that touch performance is reduced may occur.

In addition, due to a difference in capacitance between the non-square area NSA and the square area SA in the display panel 110, noise may be introduced into the touch sensing signal TSS, and thus the touch performance may be degraded.

In the touch display device 100 according to the embodiments of the present disclosure, by differentiating an overlapping area between the touch driving line transmitting the touch driving signal TDS and the touch sensing line transmitting the touch sensing signal TSS, it is possible to compensate for the difference in capacitance between the non-square area NSA and the square area SA and improve the touch sensing performance.

Figure 12:
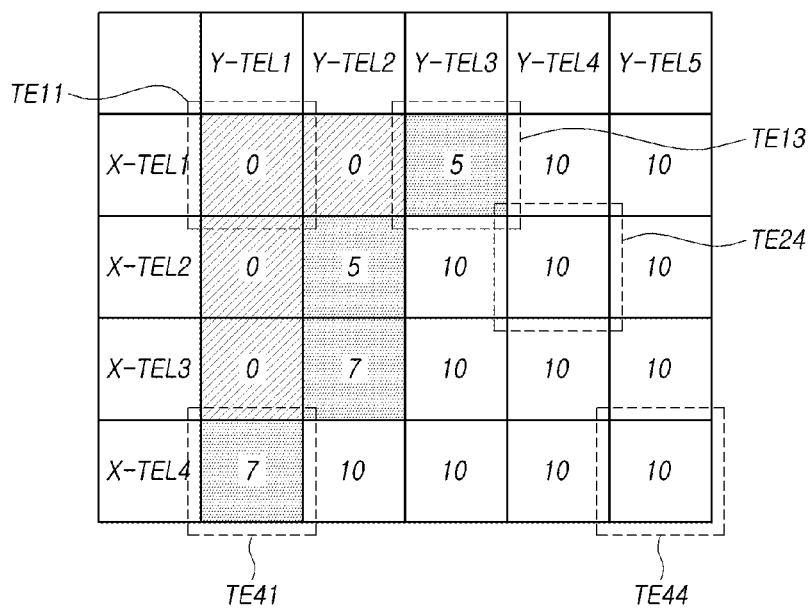
FIG. 12 is a diagram illustrating capacitance values of a non-square area with respect to portion B of FIG. 10 in the touch display device according to one embodiment of the present disclosure.

FIG. 12 is an diagram illustrating capacitance values of a non-square area with respect to portion B of FIG. 10 in the touch display device according to embodiments of the present disclosure.

Referring to FIG. 12, in the touch display device 100 according to embodiments of the present disclosure, the touch electrodes TE located outside an outer edge of a curved shape in the non-square area NSA of the display panel 110 cannot or may not transmit the touch sensing signal TSS having a capacitance value due to a touch of the user.

For example, as in portion B of FIG. 10, in the case of the display panel 110 having an upper left portion formed in a curved shape, a touch sensing signal TSS having a capacitance value of 10 may be transmitted in touch electrodes (e.g., TE24 and TE44) located in the square area SA present in the central portion of the display panel 110.

However, in the non-square area NSA, since the touch of the user is not present at the touch electrode located in the bezel area BZ of the display panel 110, for example, a touch electrode TE11 at a position at which the first X-touch electrode line X-TEL1 and the first Y-touch electrode line Y-TEL1 overlap, a touch sensing signal TSS having a capacitance value of zero may be transmitted.

On the other hand, when the touch of the user is present, touch electrodes (e.g., TE13 and TE41) located between the display area AA and the bezel area BZ in the non-square area NSA of the display panel 110 may transmit a touch sensing signal TSS having a capacitance value of 5 or 7.

In this way, in the touch display device 100 according to embodiments of the present disclosure, in order to compensate for the difference in capacitance between the touch electrode TE located in the non-square area NSA and the touch electrode TE located in the square area SA, the overlapping area between the X-touch line X-TL and the Y-touch line Y-TL is differentially formed to correspond to the difference in capacitance between the non-square area NSA and the square area SA.

Figure 13:
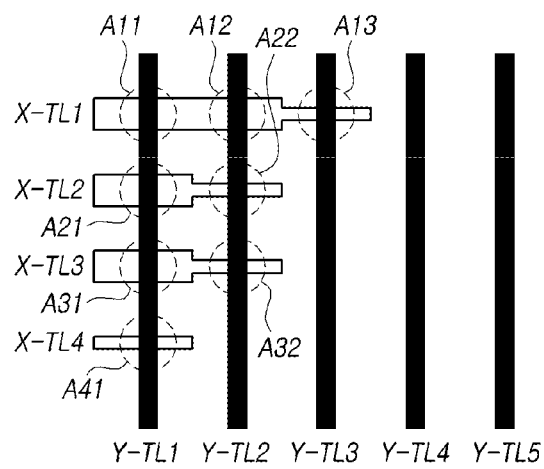
FIG. 13 is a diagram illustrating an example of a case in which overlapping areas of X-touch lines and Y-touch lines are differently formed to compensate for a difference in capacitance between a non-square area and a square area in the touch display device according to one embodiment of the present disclosure.

FIG. 13 is a diagram illustrating an example of a case in which overlapping areas of X-touch lines and Y-touch lines are differently formed to compensate for a difference in capacitance between a non-square area and a square area in the touch display device according to embodiments of the present disclosure.

In this drawing, a case in which the overlapping area between the X-touch line X-TL and the Y-touch line Y-TL is formed to correspond to the difference in capacitance illustrated in FIG. 12 is shown.

Referring to FIG. 13, in the touch display device 100 according to embodiments of the present disclosure, when the touch sensing signal TSS transmitted from the square area SA has a capacitance value of 10, the X-touch line X-TL2 and the Y-touch line Y-TL4 connected to the touch electrode (e.g., TE24) located in the square area SA may be formed not to overlap or formed such that a minimum or reduced area overlaps.

On the other hand, the X-touch line X-TL and the Y-touch line Y-TL connected to the touch electrode TE located in the non-square area NSA may have a relatively large overlapping area.

For example, since a touch electrode TE11 in a first row and a first column having a capacitance value of zero in the non-square area NSA represents the largest difference from the capacitance value of 10 in the square area SA, an area A11 in which the X-touch line X-TL1 and the Y-touch line Y-TL1 connected to the touch electrode TE11 in the first row and the first column overlap may have the largest area.

In this case, since each of a touch electrode TE12 in the the first row and a second column, a touch electrode TE21 in a second row and the first column, and a touch electrode TE31 in a third row and the first column also has a capacitance value of zero in the non-square area NSA, each of areas A12, A21, and A31 in which the X-touch line and the the Y-touch line are connected to each of the touch electrodes TE12, TE21, and TE31 may be formed to be the same as the overlapping area A11 in which the X-touch line X-TL1 and the Y-touch line Y-TL1 connected to the touch electrode TE11 in the first row and the first column overlap.

On the other hand, since each of a touch electrode TE13 in the first row and the third column and a touch electrode TE22 in the second row and the second column, each having a capacitance value of 5, has a capacitance value correspond to an intermediate value between capacitance values of zero and 10, an area A13 in which the X-touch line X-TL1 and the Y-touch line Y-TL3 connected to the touch electrode TE13 in the first row and the third column overlap, and an area A22 in which the X-touch line X-TL2 and the Y-touch line Y-TL2 connected to the touch electrode TE22 in the second row and the second column overlap may each become an area that is smaller than the area A11.

In this case, the area in which the X-touch line X-TL and Y-touch line Y-TL connected to the touch electrode TE located in the non-square area NSA overlap may be formed to become larger as a difference between the capacitance value of the touch electrode TE located in the non-square area NSA and the capacitance value of the touch electrode TE located in the square area SA increases.

That is, the area in which the X-touch line X-TL and Y-touch line Y-TL connected to the touch electrode TE located in the non-square area NSA overlap may be proportional to the difference between the capacitance value of the touch electrode TE located in the non-square area NSA and the capacitance value of the touch electrode TE located in the square area SA.

In this case, the area in which the X-touch line X-TL and Y-touch line Y-TL connected to the touch electrode TE located in the non-square area NSA overlap may be adjusted by differentiating a width of the X-touch line X-TL or the Y-touch line Y-TL according to a position.

Here, a case in which the overlapping area between the X-touch line X-TL and the Y-touch line Y-TL is differentially formed by differentiating the width of the X-touch line X-TL to which the touch driving signal is applied in the area overlapping with the Y-touch line Y-TL is illustrated.

Figure 15:
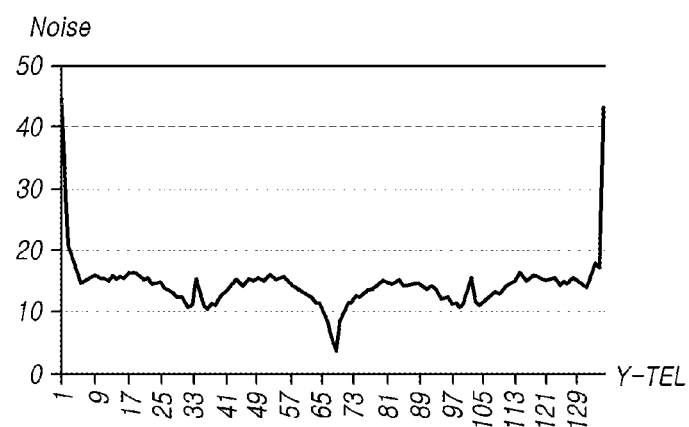
FIG. 15 is a diagram illustrating that noise in the non-square area is reduced by differentiating the overlapping area of the touch line in the touch display device according to one embodiment of the present disclosure.
Figure 15:
Figure 15:
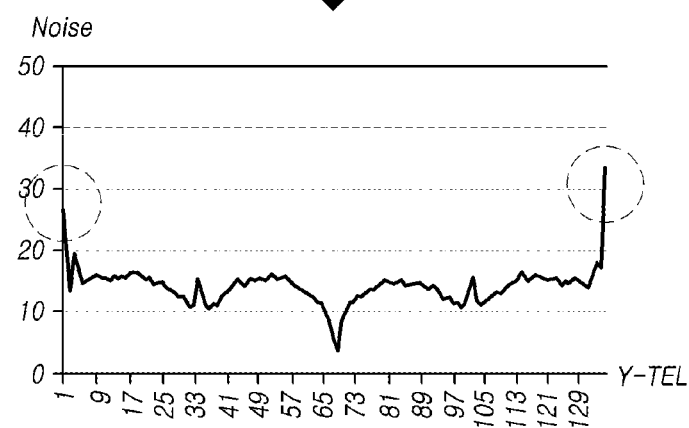

FIG. 14 is an diagram illustrating a case in which a capacitance value of the non-square area is compensated by differentiating the overlapping area of the touch line in the touch display device according to embodiments of the present disclosure, and FIG. 15 is a diagram illustrating that noise in the non-square area is reduced by differentiating the overlapping area of the touch line in the touch display device according to embodiments of the present disclosure.

Here, FIG. 14 shows a case in which, when the capacitance values of the non-square area NSA and the square area SA have the same difference as shown in FIG. 12, as shown in FIG. 13, the overlapping area between X-touch line X-TL and Y-touch line Y-TL is differentiated according to a position to compensates for the capacitance value.

Referring to FIG. 14, for example, the touch electrode TE located in the square area SA has a capacitance value of 10, whereas in the non-square area NSA, each of the touch electrode TE11 in the first row and the first column, the touch electrode TE12 in the first row and the second column, the touch electrode TE21 in the second row and the first column, and the touch electrode TE31 in the third row and the first column may have the capacitance value of 8.

Therefore, the overlapping areas A11, A12, A21, and A31 in which the X-touch line X-TL and the Y-touch line Y-TL are connected to the touch electrodes TE11, TE12, TE21, and TE31, each having the capacitance value of 8, may each be formed to have the largest overlapping area.

On the other hand, when the touch of the user is present, the touch electrodes TE13, TE22, TE32, and TE41 corresponding to the display area AA and the bezel area BZ in the non-square area NSA of the display panel 110 may each generate the touch sensing signal TSS having a capacitance value of 9.

Therefore, the overlapping areas A13, A22, A32, and A41 between the X-touch line X-TL and the Y-touch line Y-TL connected to the touch electrodes TE13, TE22, TE32, and TE41, each having the capacitance value of 9, may each be formed to have an overlapping area of an intermediate size.

On the other hand, the X-touch line X-TL and the Y-touch line connected to the touch electrode TE located in the square area SA may be formed to have the smallest overlapping area or may be formed not to overlap.

In this way, when the overlapping area of the X-touch line X-TL and the Y-touch line Y-TL connected to the touch electrode TE of the non-square area NSA is determined to be proportional to the difference between the capacitance value of the touch electrode TE located in the non-square area NSA and the capacitance value of the touch electrode TE located in the square area SA, it is possible to compensate the capacitance value of the touch sensing signal TSS generated by the touch electrode TE located in the non-square area NSA.

As a result, since the capacitance value of the touch electrode TE located in the non-square area NSA and the capacitance value of the touch electrode TE located in the square area SA may be similarly varied, as shown in FIG. 15, it is possible to prevent a saturation of the touch sensing signal TSS in a partial area due to a difference in capacitance in the process of amplifying the touch sensing signal TSS and to reduce touch noise exhibiting in the non-square area NSA.

Meanwhile, an overlapping position between the X-touch line X-TL and the Y-touch line Y-TL connected to the touch electrode TE of the non-square area NSA may be the bezel area BZ formed outside the display area AA or may be the PCB.

Figure 16:
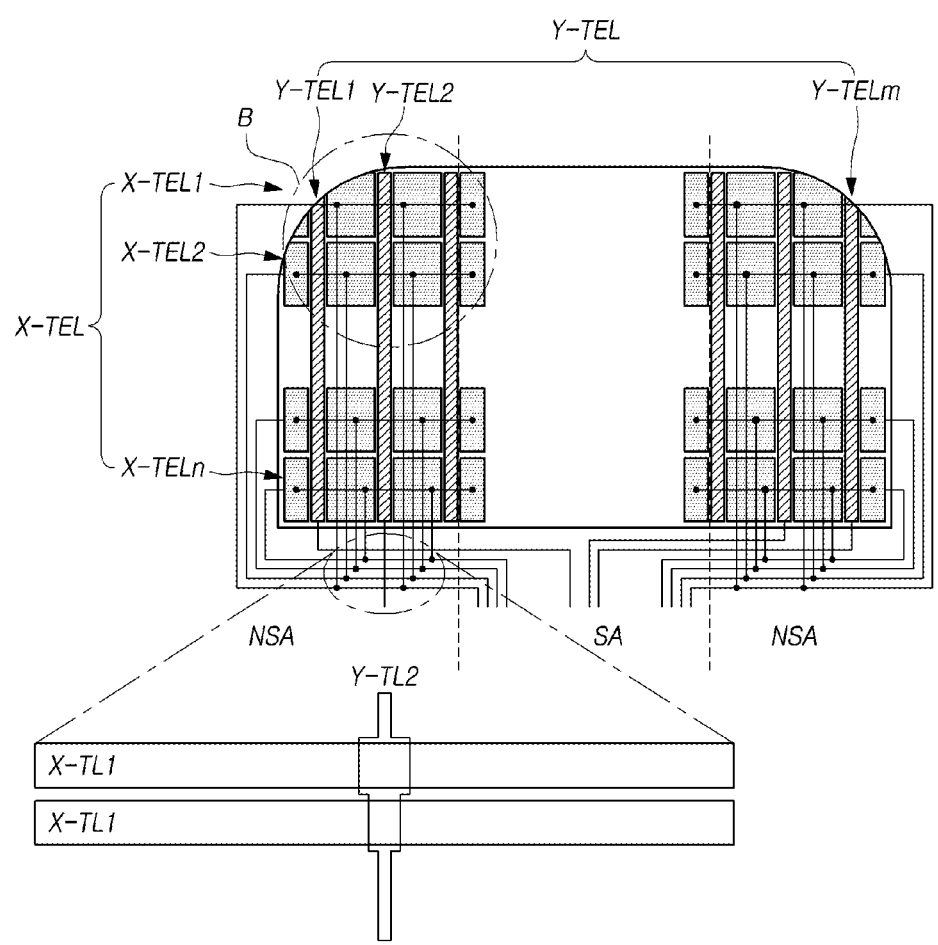
FIG. 16 is a diagram illustrating a case in which the X-touch line and the Y-touch line overlap in a bezel area in the touch display device according to one embodiment of the present disclosure.

FIG. 16 is an diagram illustrating a case in which the X-touch line and the Y-touch line overlap in a bezel area in the touch display device according to embodiments of the present disclosure.

Referring to FIG. 16, in the touch display device 100 according to embodiments of the present disclosure, the X-touch line X-TL and the Y-touch line Y-TL connected to the touch electrode TE of the non-square area NSA may overlap in the bezel area BZ formed at an outer periphery of the display area AA.

In this case, at least a portion of the X-touch line X-TL connected to X-touch electrode line X-TEL and at least a portion of the Y-touch line Y-TL connected to Y-touch electrode line Y-TEL may be disposed to overlap in the bezel area BZ.

Here, FIG. 16 shows a case in which, in order to compensate for a capacitance deviation between the touch sensing signal transmitted through the second Y-touch electrode line Y-TEL2 and the touch sensing signal transmitted through another Y-touch electrode line Y-TEL with respect to the non-square area NSA corresponding to an upper end of the display panel 110, the width of the second Y-touch line Y-TL2 connected to the second Y-touch electrode line Y-TEL2 is controlled, and thus an overlapping area between the first X-touch line X-TL1 and the second X-touch line X-TL2 is differentiated.

As described above, in order to control the overlapping area between the X-touch line X-TL and the Y-touch line Y-TL, the width of the X-touch line X-TL may be differentiated according to a position or a width of the Y-touch line Y-TL may be differentiated according to the position.

In the drawing, a case in which the width of the Y-touch line Y-TL connected to the Y-touch electrode line Y-TEL is differentiated so that the overlapping area between the X-touch line X-TL and the Y-touch line Y-TL is controlled is illustrated.

In this case, in consideration of the non-square area NSA corresponding to the upper left portion of the display panel 110, the width of the second Y-touch line Y-TL2 may be controlled to increase an overlapping area with the first X-touch line X-TL1 and the second X-touch line X-TL2. In consideration of the non-square area NSA corresponding to the upper left portion of the display panel 110, the second Y-touch line Y-TL2 may not overlap the third X-touch line X-TL3 or a partial area of the second Y-touch line Y-TL2 may overlap the third X-touch line X-TL3.

In addition, in the touch display device 100 according to embodiments of the present disclosure, the X-touch line X-TL and the Y-touch line Y-TL connected to the touch electrode TE of the non-square area NSA may overlap on the PCB.

In this case, a portion at a position where the X-touch line X-TL and the Y-touch line Y-TL overlap may be the PCB on which the touch driving circuit 150 is mounted. Alternatively, the X-touch line X-TL and the Y-touch line Y-TL may overlap on a separately provided PCB for compensation.

Figure 17:
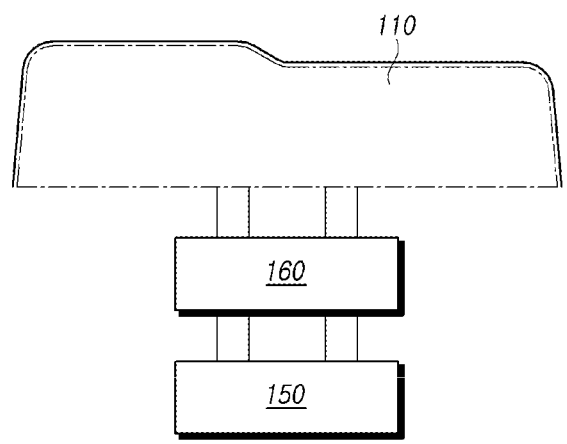
FIG. 17 is a block diagram illustrating a case in which a printed circuit board for compensation for overlapping the X-touch line and the Y-touch line is provided in the touch display device according to one embodiment of the present disclosure.
Figure 18:
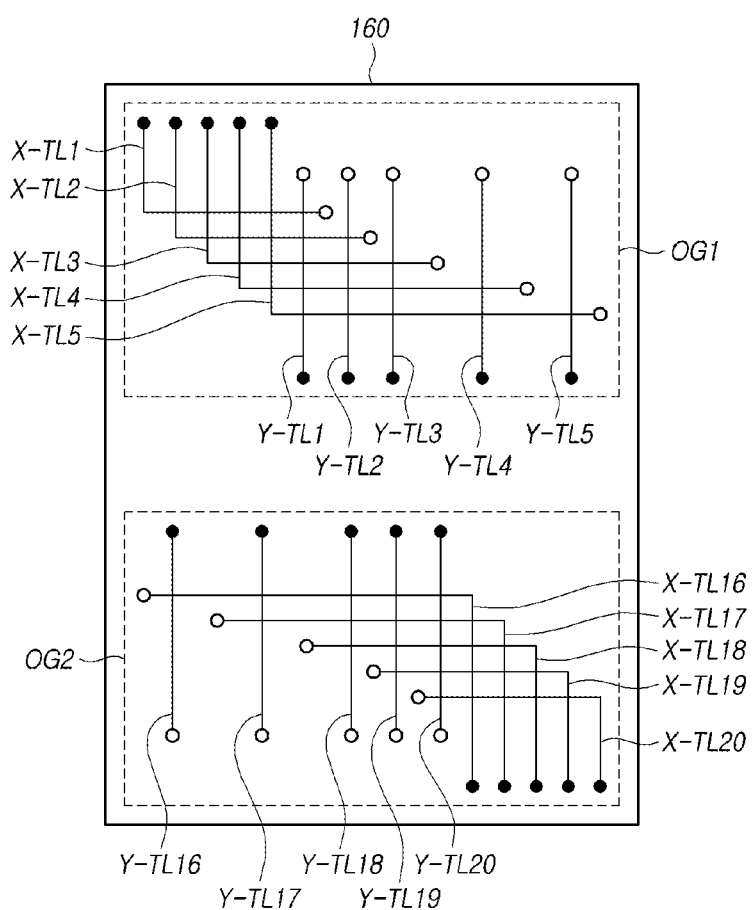
FIG. 18 is a diagram illustrating an internal configuration of the PCB for compensation in which the X-touch line and the Y-touch line overlap in the touch display device according to one embodiment of the present disclosure.

FIG. 17 is a block diagram illustrating a case in which a PCB for compensation for overlapping the X-touch line and the Y-touch line is provided in the touch display device according to embodiments of the present disclosure, and FIG. 18 is an diagram illustrating an internal configuration of the PCB for compensation in which the X-touch line and the Y-touch line overlap in the touch display device according to embodiments of the present disclosure.

Referring to FIGS. 17 and 18, the touch display device 100 according to the embodiments of the present disclosure may further include a PCB 160 for compensation in which at least a portion of the X-touch line X-TL and at least a portion of the Y-touch line Y-TL overlap between the touch driving circuit 150 and the display panel 110.

Accordingly, the at least a portion of the X-touch line X-TL for transmitting the touch driving signal from the touch driving circuit 150 to the display panel 110 and the at least a portion of the Y-touch line Y-TL for transmitting the touch sensing signal of the display panel 110 to the touch driving circuit 150 may overlap inside the PCB 160 for compensation.

In this case, non-square areas NSA, for example, the upper left portion and a lower right portion of the display panel 110, may be formed at positions symmetrical to each other.

Therefore, in consideration of the positions where the non-square areas NSA are formed, the X-touch line X-TL and the Y-touch line Y-TL may be in a plurality of overlapping groups OG1 and OG2, and the X-touch line X-TL and the Y-touch line Y-TL may be disposed according to the overlapping groups OG1 and OG2.

For example, X-touch lines (e.g., X-TL1 to X-TL5) and Y-touch lines (e.g., Y-TL1 to Y-TL5) connected to the touch electrode TE located in the non-square area NSA of the upper left portion of the display panel 110 may be classified as a first overlapping group OG1.

An area where the X-touch line X-TL and the Y-touch line Y-TL overlap in the first overlapping group OG1 may be varied according to a position of the touch electrode TE to which the X-touch line X-TL and the Y-touch line Y-TL are connected in the non-square area NSA.

For example, the first Y-touch line Y-TL1 located on the leftmost side of the display panel 110 may overlap all the first X-touch lines X-TL1 to the fifth X-touch line X-TL5 to have the largest overlapping area. On the other hand, from a left side of the display panel 110, the second Y-touch line Y-TL2 may overlap the second X-touch line X-TL2 to the fifth X-touch line X-TL5. In addition, from the left side of the display panel 110, the third Y-touch line Y-TL3 may overlap the third X-touch line X-TL3 to the fifth X-touch line X-TL5.

In this way, the overlapping area may be varied by differentiating the number of the X-touch lines X-TL overlapping the Y-touch lines Y-TL according to the position of the touch electrode TE connected in the non-square area NSA. As a result, a capacitance deviation according to the position of the touch electrode TE may be compensated for.

In addition, X-touch lines (e.g., X-TL16 to X-TL20) and Y-touch lines (e.g., Y-TL16 to Y-TL20) connected to the touch electrode TE located in the non-square area NSA of the lower right portion of the display panel 110 may be classified as the second overlapping group OG2.

The overlapping groups OG1 and OG2 may be variously classified according to a position and a shape of the non-square area NSA in the display panel 110.

Meanwhile, in order to simultaneously apply the touch driving signals to the plurality of touch driving electrodes constituting the X-touch electrode line X-TEL, when the X-touch line X-TL is formed in a multi-feeding structure, a case in which parasitic capacitance occurs due to a gap between the X-touch line X-TL to which the touch driving signal is applied and the Y-touch electrode line Y-TEL through which the touch sensing signal is transmitted, and thus touch performance is degraded may occur.

Figure 19:
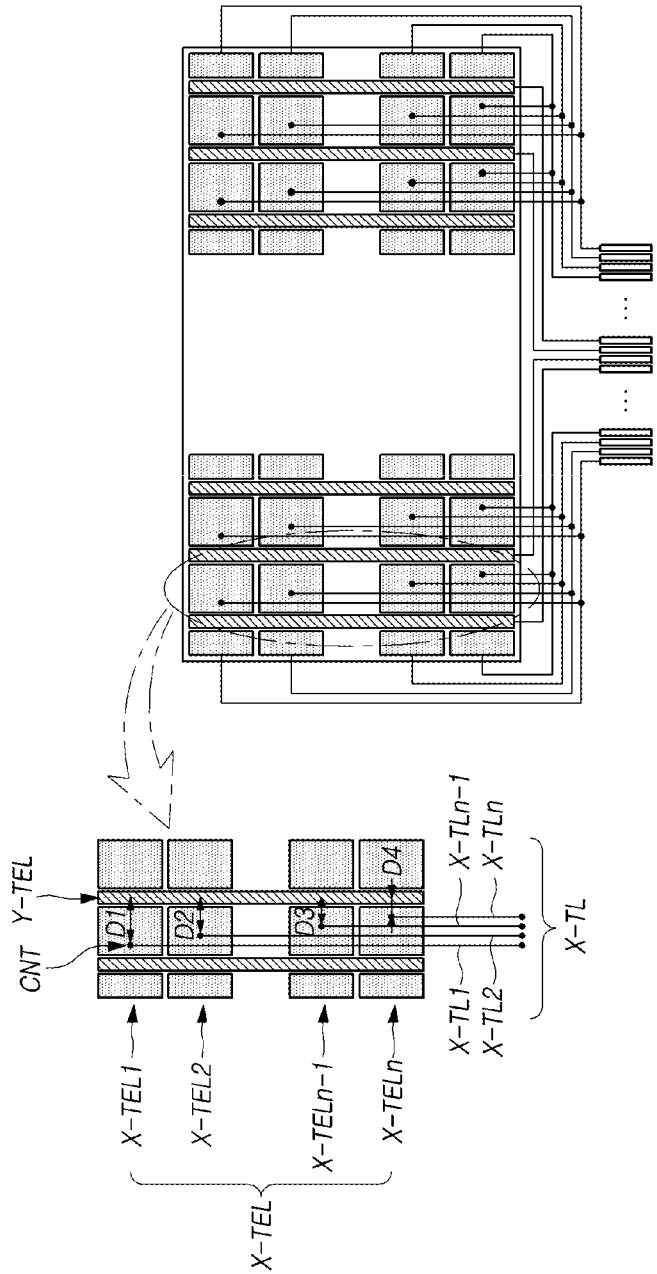
FIG. 19 is a diagram illustrating a gap between a touch line to which a touch driving signal is applied and a touch sensing electrode line to which a touch sensing signal is transmitted in the touch display device according to one embodiment of the present disclosure.

FIG. 19 is an diagram illustrating a gap between a touch line to which a touch driving signal is applied and a touch sensing electrode line to which a touch sensing signal is transmitted in the touch display device according to embodiments of the present disclosure.

Here, an example in which the X-touch electrode lines X-TEL1, . . . , X-TELn in the x-axis direction are formed of a plurality of corresponding X-touch electrodes, and the Y-touch electrode line Y-TEL in the y-axis direction is formed of one corresponding Y-touch electrode is illustrated. Accordingly, a plurality of X-touch electrodes disposed in the same row in the x-axis direction may be connected through the same X-touch line X-TL.

In this case, the touch driving signal may be applied to the first X-touch electrode line X-TEL1 located in the first row through the first X-touch line X-TL1, and the touch driving signal may be applied to the second X-touch electrode line X-TEL2 located in the second row through the second X-touch line X-TL2. Similarly, the touch driving signal may be applied to an $(n-1)^{th}$ X-touch electrode line X-TELn-1 located in an $(n-1)^{th}$ row through the $(n-1)_{th}$ X-touch line X-TLn-1, and the touch driving signal may be applied to an $n^{th}$ X-touch electrode line X-TELn located in an $n^{th}$ row through an $n^{th}$ X-touch line X-TLn.

In such a structure, when the X-touch line X-TL is formed in a straight line, due to a position of a contact hole CNT where the X-touch line X-TL and the X-touch electrode line X-TEL are connected, gaps D1, ..., Dn between the Y-touch electrode lines Y-TEL corresponding to the touch sensing electrodes and the X-touch lines X-TL are differentiated for each position of the X-touch electrode lines X-TEL.

As shown in FIG. 19, the gap D1 between the first X-touch line X-TL1 and the Y-touch electrode line Y-TEL which are electrically connected to the first X-touch electrode line X-TEL1, the gap D2 between the second X-touch line X-TL2 and the Y-touch electrode line Y-TEL which are electrically connected to the second X-touch electrode line X-TEL2, the gap Dn-1 between the $(n-1)^{th}$ X-touch line X-TLn-1 and the Y-touch electrode line Y-TEL which are electrically connected to the $(n-1)^{th}$ X-touch electrode line X-TELn-1, and the gap Dn between the $n^{th}$ X-touch line X-TLn and the Y-touch electrode line Y-TEL which are electrically connected to the $n^{th}$ X-touch electrode line X-TELn are different from each other based on the Y-touch electrode line Y-TEL.

Consequently, even when a touch on an X-touch electrode at a specific position occurs, parasitic capacitance may be generated due to another X-touch line X-TL passing through a corresponding X-touch electrode, and touch performance may be degraded due to a deviation in parasitic capacitance according to a difference in distance from the Y-touch electrode line Y-TEL.

In particular, the above phenomenon may become larger in the case of a multi-touch in which a plurality of fingers simultaneously touch the plurality of X-touch electrodes.

Figure 20:
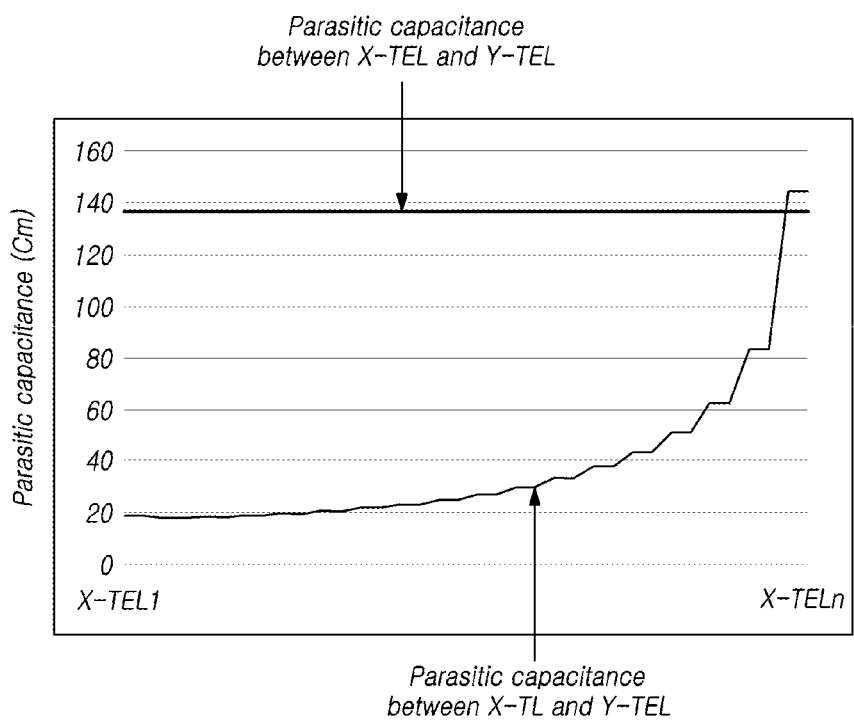
FIG. 20 is a diagram illustrating an example of parasitic capacitance generated in a Y-touch electrode line in a touch display device with a multi-feeding structure.

FIG. 20 is a diagram illustrating an example of parasitic capacitance generated in a Y-touch electrode line in a touch display device with a multi-feeding structure.

Referring to FIG. 20, in the touch display device 100 of a multi-feeding structure, since the X-touch electrode lines X-TEL corresponding to the touch driving electrodes are uniformly disposed around the Y-touch electrode lines Y-TEL corresponding to the touch sensing electrodes, parasitic capacitances Cm formed between the X-touch electrode lines X-TEL and the Y-touch electrode lines Y-TEL may have a uniform distribution.

On the other hand, due to the position of the contact hole CNT where the X-touch line X-TL and the X-touch electrode line X-TEL are connected, since the gaps D1, ..., Dn between the Y-touch electrode lines Y-TEL and the X-touch lines X-TL are different for each position of the X-touch electrode lines X-TEL, the parasitic capacitances Cm formed between the X-touch lines X-TL and the Y-touch electrode lines Y-TEL may be formed in a non-uniform distribution.

In particular, as a position is close to the touch driving circuit 150, a greater number of X-touch lines X-TL may be disposed. In this case, as the position is closer to the touch driving circuit 150, the parasitic capacitance Cm formed between the X-touch line X-TL and the Y-touch electrode line Y-TEL may increase.

Thus, when the touch line TL is formed in a multi-feeding structure to simultaneously apply the touch driving signals to the plurality of touch driving electrodes constituting the X-touch electrode line X-TEL, due to the parasitic capacitance Cm formed between the X-touch line X-TL and the Y-touch electrode line Y-TEL, the touch performance may be degraded and it may be difficult to determine an exact touch position.

To solve the above problem, the gaps D1, ..., Dn between the Y-touch electrode lines Y-TEL corresponding to the touch sensing electrodes and the X-touch lines X-TL corresponding to the touch driving lines may be uniformly formed to reduce a deviation in parasitic capacitances Cm formed between the X-touch lines X-TL and the Y-touch electrode lines Y-TEL.

Figure 21:
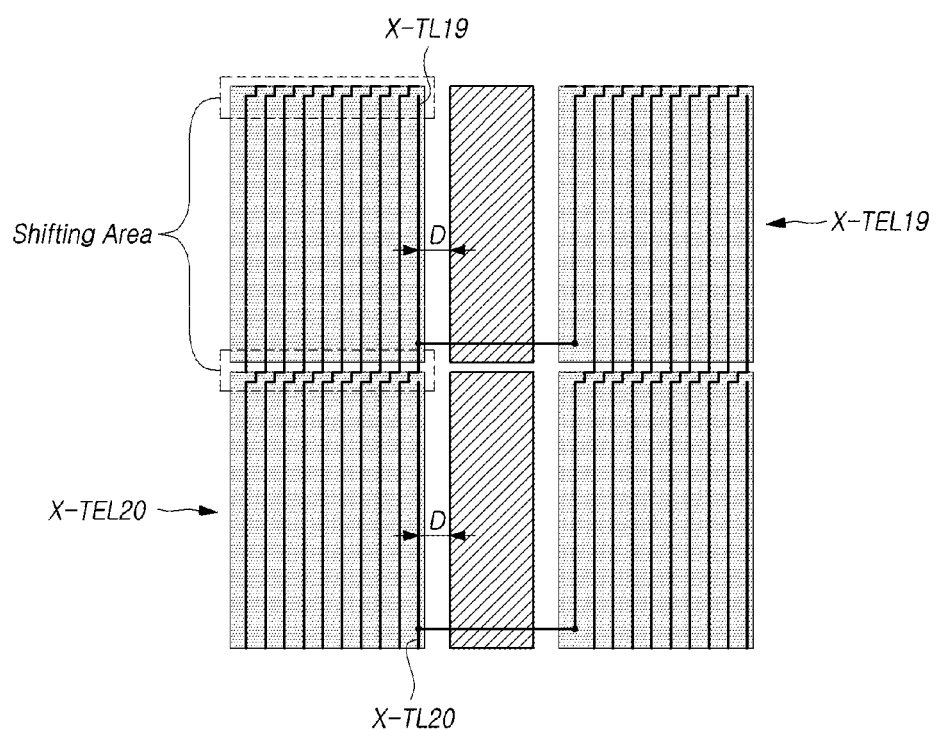
FIG. 21 is a diagram illustrating a structure of the touch line of the touch display device according to one embodiment of the present disclosure.

FIG. 21 is an diagram illustrating a structure of the touch line of the touch display device according to embodiments of the present disclosure.

Referring to FIG. 21, in the touch display device 100 according to the embodiments of the present disclosure, the display panel 110 includes the X-touch electrode line X-TEL which is formed of the plurality of X-touch electrodes disposed in the x-axis direction and to which the touch driving signals are simultaneously applied, the Y-touch electrode line Y-TEL disposed in the y-axis direction and configured to transmit the touch sensing signals, and the plurality of X-touch lines X-TL disposed in the y-axis direction and electrically connected to a designated X-touch electrode through the contact hole CNT, and configured to transmit the touch driving signals. The plurality of X-touch lines X-TL may be disposed such that a gap D between the contact hole CNT connected to a designated X-touch electrode and an adjacent Y-touch electrode line Y-TEL is constant.

For example, among the plurality of X-touch lines X-TL, a $20^{th}$ X-touch line X-TL20 closest to the Y-touch electrode line Y-TEL may be electrically connected to a $20^{th}$ X-touch electrode line X-TEL20 through the contact hole CNT at a position spaced apart from the Y-touch electrode line Y-TEL by a predetermined or selected gap D. Accordingly, a separation gap between the $20^{th}$ X-touch line X-TL20 and the Y-touch electrode line Y-TEL connected to the $20^{th}$ X-touch electrode line X-TEL20 may become D.

Since the $20^{th}$ X-touch line X-TL20 is electrically connected to the $20^{th}$ X-touch electrode line X-TEL20 through the contact hole CNT, the $20^{th}$ X-touch line X-TL20 may be located only up to a shifting area of the $20^{th}$ X-touch electrode line X-TEL20 and may not extend to an upper area out of the $20^{th}$ X-touch electrode line X-TEL20.

On the other hand, the first X-touch line X-TL1 to the $19^{th}$ X-touch line X-TL19 are formed to be shifted in a direction from the shifting area of the $20^{th}$ X-touch electrode line X-TEL20 to the Y-touch electrode line Y-TEL.

In this case, a shifted distance of the $19^{th}$ X-touch line X-TL19 in the shifting area may correspond to a gap between the $19^{th}$ X-touch line X-TL19 and the $20^{th}$ X-touch electrode line X-TEL20. As a result, a position at which the $19^{th}$ X-touch line X-TL19 is shifted in the shifting area corresponds to a position at which a separation distance from the Y-touch electrode line Y-TEL is a gap D. Consequently, like the $20^{th}$ X-touch line X-TL20, a position at which the $19^{th}$ X-touch line X-TL19 is connected to the $19^{th}$ X-touch electrode line X-TEL19 may become a position at which a separation distance from the Y-touch electrode line Y-TEL is the gap D.

Similarly, the $19^{th}$ X-touch line X-TL19 may be located only up to the shifting area of the $19^{th}$ X-touch electrode line X-TEL19 and may not extend to an upper area out of the $19^{th}$ X-touch electrode line X-TEL19.

On the other hand, the first X-touch line X-TL1 to the $18^{th}$ X-touch line X-TL18 are formed to be shifted in a direction from the shifting area of the $19^{th}$ X-touch electrode line X-TEL19 to the Y-touch electrode line Y-TEL. As a result, a position at which the $18^{th}$ X-touch line X-TL18 is connected to the $18^{th}$ X-touch electrode line X-TEL18 may become a position at which a separation distance from the Y-touch electrode line Y-TEL is the gap D.

In this way, by shifting the remaining X-touch lines in the shifting area, excluding the X-touch line X-TL connected to the X-touch electrode line X-TEL, a position at which each X-touch line X-TL is electrically connected to the X-touch electrode line X-TEL through the contact hole CNT may be disposed to have a constant separation distance from the Y-touch electrode line Y-TEL.

In this case, the shifting area in which the X-touch line X-TL is formed in a shifting structure may correspond to an edge area of the X-touch electrode line X-TEL for uniform arrangement with respect to the Y-touch electrode line Y-TEL. For example, when the touch driving circuit 150 is located at a lower portion of the display panel 110, since the X-touch line X-TL extends upward from the lower portion of the display panel 110, the shifting area in which the X-touch line X-TL is formed in the shifting structure may correspond to an upper edge area of the X-touch electrode line X-TEL.

In addition, the X-touch electrode lines X-TEL located on both sides of the Y-touch electrode line Y-TEL may be connected through a bridge line. In this case, a position at which the bridge line is connected may correspond to the contact hole CNT where the X-touch line X-TL is electrically connected to the X-touch electrode line X-TEL. In this case, the bridge line connecting the X-touch electrode lines X-TEL located on the both sides of the Y-touch electrode line Y-TEL, and the X-touch line X-TL electrically connected to the X-touch electrode line X-TEL may be connected by one contact hole CNT.

In this case, the contact hole CNT where the X-touch line X-TL is electrically connected to the X-touch electrode line X-TEL may be formed in an edge area of the X-touch electrode line X-TEL adjacent to the Y-touch electrode line Y-TEL.

In addition, for uniform arrangement of the Y-touch electrode line Y-TEL, the X-touch line X-TL may be formed to form a symmetrical structure with the Y-touch electrode line Y-TEL based on the contact hole CNT connected by the bridge line.

As described above, in order to compensate the capacitance value of the non-square area NSA, by differentiating the overlapping area between the X-touch line X-TL and the Y-touch line Y-TL, which corresponds to the non-square area NSA, through the PCB 160 for compensation, it may be possible to compensate for the deviation in capacitance of the touch electrode TE formed in the non-square area NSA and improve touch sensitivity.

According to embodiments of the present disclosure, by compensating for a difference in capacitance between a non-square touch node and a general touch node in a non-square display panel, there is an effect capable of providing a touch display device and a display panel in which touch noise can be reduced and touch sensing performance can be improved.

In addition, according to embodiments of the present disclosure, by differentiating an overlapping area of a touch driving line transmitting a touch driving signal and a touch sensing line transmitting a touch sensing signal, there is an effect of providing a touch display device and a display panel which can compensate for a difference in capacitance between a non-square area and a square area.

Effects of the embodiments disclosed herein are not limited to the above-described effects. In addition, the embodiments disclosed herein may have other effects not described above, and these effects will be clearly understood by those skilled in the art from the above description.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
    a display panel having:
        a flexible substrate including a display area and non-display area;
        a light-emitting element over the flexible substrate;
        a touch buffer layer over the light-emitting element;
        a plurality of X-touch lines, which extend in a first direction;
        a plurality of Y-touch lines, which extend in a second direction,
        wherein a plurality of overlapping areas in which at least some of the plurality of X-touch lines and at least some of the plurality of Y-touch lines cross over each other are different from each other,
        wherein the plurality of overlapping areas are on the touch buffer layer, and
        wherein the plurality of overlapping areas are in the non-display area of the display panel.

2. The display device of claim 1, wherein at least some of the plurality of X-touch lines overlap at least some of the plurality of Y-touch lines in a bezel area of the display panel.

3. The display device of claim 1, further comprising,
    a touch driving circuit configured to supply the touch driving signal to the plurality of X-touch electrode lines and to receive the touch sensing signal from the plurality of Y-touch electrode lines to sense a touch,
    wherein at least some of the plurality of X-touch lines overlap at least some of the plurality of Y-touch electrode lines in a printed circuit board that includes the touch driving circuit.

4. The display device of claim 3, wherein at least some of the plurality of X-touch electrode lines overlap at least some of the plurality of Y-touch lines in a printed circuit board for compensation located between the touch driving circuit and the display panel.

5. The display device of claim 4, wherein the plurality of X-touch lines and the plurality of Y-touch lines are in a plurality of groups according to positions of the plurality of X-touch electrode lines and the plurality of Y-touch electrode lines, and overlapping areas between the plurality of X-touch lines and the plurality of Y-touch lines are determined for each group of the plurality of groups.

6. The display device of claim 1, wherein a first overlapping area of the plurality of overlapping areas is associated with an X-touch line and a Y-touch line, the X-touch line being connected to a first X-touch electrode line located in a non-square area among the plurality of X-touch electrode lines, the Y-touch line being connected to a first Y-touch electrode line located in the non-square area among the plurality of Y-touch electrode lines, the first overlapping area being larger than other overlapping areas associated with other X-touch lines and other Y-touch lines.

7. The display device of claim 6, wherein the first overlapping area is proportional to a difference between a capacitance value of the non-square area and a capacitance value of a square area.

8. The display device of claim 1, wherein the plurality of overlapping areas are determined by varying widths of at least some of the plurality of X-touch lines.

9. The display device of claim 1, wherein the plurality of overlapping areas are determined by varying widths of at least some of the plurality of Y-touch lines.

10. The display device of claim 1, wherein the plurality of overlapping areas are determined by varying widths of at least some of the plurality of X-touch lines and widths of at least some of the plurality of Y-touch lines.

11. The display device of claim 1, wherein widths of at least some of the plurality of X-touch lines or widths of at least some of the plurality of Y-touch lines are varied in the plurality of overlapping areas.

12. The display device of claim 1, wherein the plurality of overlapping areas in which the plurality of X-touch lines and the plurality of Y-touch lines cross over each other in the non-display area is different from a second plurality of overlapping areas in which the plurality of X-touch lines and the plurality of Y-touch lines cross over each other in the display area.

13. The display device of claim 1,
wherein the display having a plurality of touch electrodes,
wherein the plurality overlapping areas located in a non-square area are adjusted by differentiating a width of the X-touch line or the Y-touch line according to a position.

14. The display device of claim 1,
wherein the display having a non-square area and a square area,
wherein a number of the plurality of overlapping areas in which the at least some of the plurality of X-touch electrode lines and the at least some of the plurality of Y-touch electrode lines cross over each other are different from each other, differs between the non-square area and the square area.

15. The display device of claim 1,
wherein the display having a plurality of X-touch electrodes,
wherein the plurality of X touch lines simultaneously apply the touch driving signal to the X-touch electrodes in the same row or column among the plurality of X-touch electrodes.

16. The display device of claim 1,
wherein the display having a plurality of touch electrodes,
wherein the plurality of Y-touch electrode lines are electrically connected to a corresponding Y-touch pad through the Y-touch lines respectively.

17. The display device of claim 15,
wherein the display having a plurality of Y-touch electrodes,
wherein a shape of the X-touch electrodes is different from a shape of the Y-touch electrodes.

18. The display device of claim 1,
wherein a width of each of the Y-touch electrode lines in the first direction is different from a width of each of the X-touch electrode lines in the second direction.

19. The display device of claim 1,
wherein a first overlapping area of the plurality of overlapping areas is associated with an X-touch line and a Y-touch line, the X-touch line being connected to an X-touch electrode line located in a non-square area among the plurality of X-touch electrode lines, the Y-touch line being connected to a Y-touch electrode line located in the non-square area among the plurality of Y-touch electrode lines, the first overlapping area being larger than other overlapping areas associated with other X-touch lines and other Y-touch lines.

20. The display device of claim 1,
wherein a first X-touch line among the plurality of X-touch lines intersects with a first Y-touch line among the plurality of Y-touch lines, the first Y-touch line having a first width, and intersects with a second Y-touch line among the plurality of Y-touch lines, the second Y-touch line having a second width which is different from the first width, and does not intersect with a third Y-touch line among the plurality of Y-touch lines.

* * * * *